US012811334B2

(12) United States Patent
Yong et al.

(10) Patent No.: US 12,811,334 B2
(45) Date of Patent: Nov. 24, 2026

(54) DUAL CONDUCTOR CABLE ADAPTER

(71) Applicant: Molex, LLC, Lisle, IL (US)

(72) Inventors: Khang Choong Yong, Selangor (MY); John C. Laurx, Aurora, IL (US); Jose J. Gonzalez, Jr., Joliet, IL (US); Marc E Krause, Darien, IL (US)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 18/881,738

(22) PCT Filed: Jul. 17, 2023

(86) PCT No.: PCT/IB2023/057269
§ 371 (c)(1),
(2) Date: Jan. 7, 2025

(87) PCT Pub. No.: WO2024/018360
PCT Pub. Date: Jan. 25, 2024

(65) Prior Publication Data

US 2025/0392069 A1 Dec. 25, 2025

Related U.S. Application Data

(60) Provisional application No. 63/390,638, filed on Jul. 20, 2022.

(51) Int. Cl.
*H01R 13/50* (2006.01)
*H01R 13/502* (2006.01)

(52) U.S. Cl.
CPC .................................. *H01R 13/502* (2013.01)

(58) Field of Classification Search
CPC .. H01R 31/06; H01R 13/6658; H01R 31/065; H01R 12/716; H01R 24/50
See application file for complete search history.

(56) References Cited

U.S. PATENT DOCUMENTS 3,143,595 A * 8/1964 Martin ..................... H01R 4/72 174/90
3,331,917 A * 7/1967 O'Keefe ............. H01R 9/0518 174/75 C (Continued)

FOREIGN PATENT DOCUMENTS

CN 210430347 U 4/2020
CN 211655147 U 10/2020

(Continued)

OTHER PUBLICATIONS

International Preliminary Report on Patentability received for PCT Application No. PCT/IB2023/057269, mailed on Jan. 30, 2025, 10 pages.

(Continued)

*Primary Examiner* — Truc T Nguyen

(57) ABSTRACT

Aspects and embodiments of transitional cable adapters are described. One example cable adapter includes an adapter insert and a housing around the adapter insert. The adapter insert includes two conductive apertures. The conductive apertures include a first aperture length, a second aperture length, and a transition between the first and second lengths. The conductive apertures include a conductive lining on inner surfaces in one example. The first aperture length can be formed to a first diameter for a first gauge of a first conductor, and the second aperture length can be formed to a second diameter for a second gauge of a second conductor. An improved transition provided by the adapter can reduce signal reflections, reduce interference and crosstalk, reduce distortion, increase signal to noise ratios, and increase bandwidth in transitions between conductors of different diameters, such as conductors of different diameters in twinax cables.

16 Claims, 18 Drawing Sheets

(56) References Cited

U.S. PATENT DOCUMENTS

| | | | | | |
|---|---|---|---|---|---|
| 3,390,227 | A * | 6/1968 | Shlesinger, Jr. | H01R 4/206 | 439/423 |
| 3,404,216 | A * | 10/1968 | Amann | H01R 4/20 | 174/90 |
| 3,596,231 | A * | 7/1971 | Melton | H01R 4/20 | 174/93 |
| 4,176,244 | A * | 11/1979 | Ramy | H02G 15/085 | 174/75 C |
| 4,238,639 | A * | 12/1980 | Palmieri | H02G 15/103 | 174/88 C |
| 4,829,146 | A * | 5/1989 | Duve | H01R 4/20 | 174/94 R |
| 5,422,438 | A * | 6/1995 | Lamome | H01R 4/70 | 174/76 |
| 5,432,302 | A * | 7/1995 | Abdow | H02G 15/18 | 174/84 R |
| 6,113,410 | A | 9/2000 | Heit et al. | | |
| 6,310,292 | B1 * | 10/2001 | Osborn | H01R 4/20 | 174/84 C |
| 7,256,348 | B1 * | 8/2007 | Endacott | H01R 4/20 | 174/84 C |
| 7,422,480 | B1 | 9/2008 | Musick et al. | | |
| 7,456,362 | B2 * | 11/2008 | Allais | H01R 4/68 | 174/94 R |
| 7,767,909 | B2 * | 8/2010 | Krabs | H01R 9/0503 | 174/84 C |
| 8,263,865 | B2 | 9/2012 | Takayama | | |
| 8,500,497 | B1 * | 8/2013 | Patten | H01R 11/09 | 439/805 |
| 9,124,009 | B2 | 9/2015 | Atkinson et al. | | |
| 9,608,590 | B2 | 3/2017 | Hamner et al. | | |
| 10,418,759 | B2 | 9/2019 | Huber | | |
| 10,707,597 | B2 | 7/2020 | Bergner et al. | | |
| 11,791,572 | B2 * | 10/2023 | Chen | H01R 11/09 | 439/733.1 |
| 2003/0079902 | A1 * | 5/2003 | Luzzi | H02G 15/105 | 174/88 R |
| 2006/0102375 | A1 | 5/2006 | Tamm | | |
| 2008/0017409 | A1 * | 1/2008 | Takeuchi | H05K 1/186 | 174/250 |
| 2008/0023224 | A1 * | 1/2008 | Gumley | H01R 4/206 | 174/84 C |
| 2008/0032554 | A1 * | 2/2008 | Kuo | H01R 31/06 | 439/607.41 |
| 2008/0217055 | A1 * | 9/2008 | Gumley | H01R 4/206 | 174/84 C |
| 2009/0117767 | A1 * | 5/2009 | Liu | H01R 33/0827 | 439/242 |
| 2009/0163086 | A1 * | 6/2009 | Janulis | H01R 4/4821 | 439/787 |
| 2009/0305521 | A1 * | 12/2009 | Yang | H01R 4/02 | 439/56 |
| 2010/0055973 | A1 * | 3/2010 | Yang | H01R 13/6658 | 439/490 |
| 2010/0147585 | A1 * | 6/2010 | Kobayashi | H01R 43/048 | 29/854 |
| 2010/0330841 | A1 | 12/2010 | Zhang et al. | | |
| 2011/0294350 | A1 | 12/2011 | Stagi | | |
| 2014/0197958 | A1 * | 7/2014 | Madden | H02G 5/00 | 174/88 B |
| 2015/0136445 | A1 * | 5/2015 | Griffin | B29C 48/157 | 174/169 |
| 2015/0364880 | A1 * | 12/2015 | Petersen | H01R 24/40 | 174/105 R |
| 2019/0267761 | A1 * | 8/2019 | Wu | H01R 12/722 | |
| 2023/0318237 | A1 * | 10/2023 | Copper | H01R 13/6581 | 439/607.02 |
| 2024/0388020 | A1 | 11/2024 | Zhang et al. | | |

FOREIGN PATENT DOCUMENTS

| | | | | | |
|---|---|---|---|---|---|
| CN | 109891683 | B | | 5/2022 | |
| CN | 218731808 | U | | 3/2023 | |
| EP | 0753903 | A1 | | 1/1997 | |
| JP | S4891588 | A | | 11/1973 | |
| JP | S63150875 | A | | 6/1988 | |
| JP | H04286884 | A | | 10/1992 | |
| JP | H09245855 | A | | 9/1997 | |
| JP | 2000349501 | A | | 12/2000 | |
| JP | 2003297494 | A | | 10/2003 | |
| JP | 2006237005 | A | | 9/2006 | |
| JP | 2008021646 | A | | 1/2008 | |
| JP | 2015018697 | A | | 1/2015 | |
| JP | 2016201234 | A | | 12/2016 | |
| JP | 2018063893 | A | | 4/2018 | |
| TW | 200633322 | A | | 9/2006 | |
| WO | WO 2017/044831 | | * | 3/2017 | H01R 13/65 |
| WO | WO-2017044831 | A1 | * | 3/2017 | H01R 13/6599 |

OTHER PUBLICATIONS

International Search Report and Written Opinion received for PCT Application No. PCT/IB2023/057269, mailed on Oct. 17, 2023, 13 pages.

* cited by examiner

DUAL CONDUCTOR CABLE ADAPTER

CROSS-REFERENCE TO RELATED APPLICATIONS

This application claims the benefit of and priority to U.S. Provisional Patent Application No. 63/390,638, filed Jul. 20, 2022, titled "DUAL CONDUCTOR CABLE ADAPTER," the entire contents of which are hereby incorporated herein by reference.

BACKGROUND

The amount of data processed by computers, computing systems, and computing environments continues to increase. For example, data centers can include hundreds of networking and computing systems and subsystems interconnected using optical cables, copper cables, and various connectors and terminations between them. The data throughput of these interconnects is high and increasing. As examples, many data centers incorporate a combination of 10 Gigabit Ethernet (10GbE), 25 GbE, 50 GbE, and 100 GbE network interfaces and interconnects. 200 GbE, 400 GbE, and 800 GbE interconnection technology is also being developed and deployed. A range of different interconnection solutions are available for data communication, however, and other interconnection solutions rely upon 56 Gigabit per second (Gb/s) and 112 Gb/s network interfaces and interconnects, and 224 Gb/s interconnection technology is being developed. A range of different modulation techniques and protocols are relied upon among the interconnect solutions, and four-level pulse amplitude modulation (PAM) is an example modulation technique used in 112 Gb/s network interconnects.

SUMMARY

Aspects and embodiments of transitional cable adapters are described. Improved transitions provided by the cable adapters can reduce signal reflections, reduce interference and crosstalk, reduce distortion, increase signal to noise ratios, and increase bandwidth in transitions between conductors of different diameters, such as conductors of different diameters in twinax cables, for example.

One example transitional cable adapter includes an adapter insert and a housing around the adapter insert. The adapter insert includes a conductive aperture having a first aperture length for a first conductor, a second aperture length for a second conductor, and a transition between the first aperture length and the second aperture length. The first aperture length of the conductive aperture can be formed to a first diameter for a first gauge of the first conductor, and the second aperture length of the conductive aperture can be formed to a second diameter for a second gauge of the second conductor. The adapter insert can also include a number of conductive apertures, such as two or more, where each conductive aperture includes a first diameter for a first gauge of the first conductor and a second diameter for a second gauge of the second conductor.

In other aspects of the embodiments, the transition between the first aperture length of the conductive aperture and the second aperture length of the conductive aperture can be positioned between a front surface of the adapter insert and a back surface of the adapter insert. The transition between the first aperture length of the conductive aperture and the second aperture length of the conductive aperture can include a tapered aperture length in some cases. The tapered aperture length can have a tapering diameter, where the tapering diameter tapers from a first diameter of the first aperture length to a second diameter of the second aperture length.

The conductive apertures can include a lining of conductive material on inner surfaces of the apertures within the adapter insert. The conductive lining can include a lining of at least one layer of metal or metal alloy. The adapter insert can also include a lining of conductive material on a region of an outer surface of the adapter insert. The adapter housing can also be formed from a metal or metal alloy. The inner surface of the housing can contact and be electrically coupled to the lining of conductive material on the region of the outer surface of the adapter insert.

In other aspects of the embodiments, the housing can include a gap, and the adapter insert can include an interlock feature sized to fit within the gap of the housing, to secure and position the adapter insert with the housing. The housing can also include a first detent on a first side of the housing and a second detent on a second side of the housing, for positioning and securing a connector to the housing.

In other examples, a transitional adapter for a cable includes an adapter insert and a housing around the adapter insert. The adapter insert includes a conductive transition. The conductive transition includes a first conductive length for a first conductor, a second conductive length for a second conductor, and a transition between the first conductive length and the second conductive length. The transition between the first conductive length and the second conductive length can include a tapering width, tapering from a first width of the first conductive length to a second width of the second conductive length.

In other aspects, the adapter insert further includes a printed circuit board (PCB), and the first conductive length, the second conductive length, and the transition are formed as traces on a first side of the PCB. The PCB can include a ground plane on a second side of the PCB, and the first conductive length, the second conductive length, and the transition can be formed as microstrip traces on the first side of the PCB. The adapter insert can also include an air gap under the PCB.

Various cable assemblies are also described. In one example, a cable assembly includes a cable and a transitional cable adapter at one end of the cable. The transitional cable adapter includes an adapter insert and a housing around the adapter insert, as described herein.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION OF THE PREFERRED EMBODIMENTS

Figure 1A:
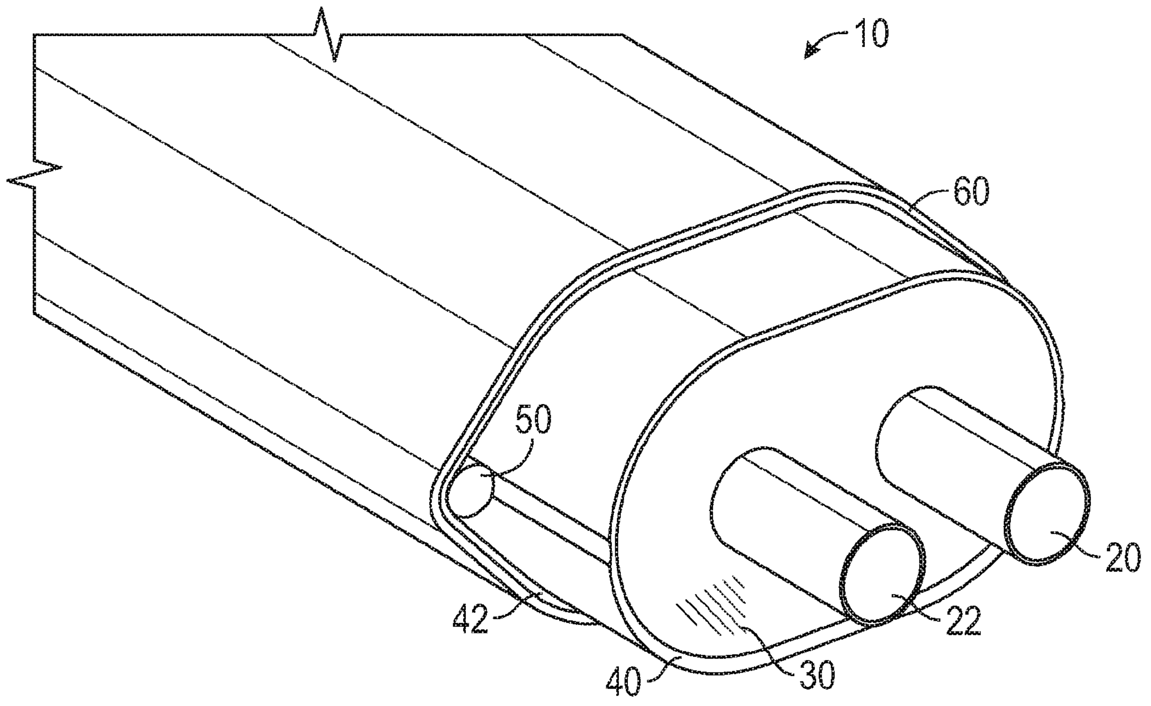
FIG. 1A illustrates a perspective view of an example cable according to various embodiments of the present disclosure.

As noted above, the amount of data processed by computers, computing systems, and computing environments continues to increase. Data centers can include hundreds of networking and computing systems that are interconnected using optical cables, copper cables, and various connectors and terminations therebetween. Data is often carried on these cables using radio frequency (RF) signals at microwave frequencies. A range of different interconnection techniques can be relied upon in data centers, such as die-to-die, die-to-optical engine, chip-to-module, chip-to-chip on the same printed circuit board (PCB), chip-to-chip on different PCBs, and other interconnections. To achieve higher throughputs, some interface technologies use direct attach copper cable (DAC), active optical cable (AOC) interconnect solutions, and others.

The design of cables, connectors, and interconnects for microwave signals is an important concern to maintain the high (and increasing) data throughput needed in data centers and other systems. In that context, the transitions between conductors in cables should be carefully considered and designed. A number of different electrical and mechanical arrangements have been proposed to maintain the bandwidth at the transitions for microwave signals. Even well-designed transitions can impart electrical discontinuities, impedance or permittivity mismatches, and other mismatches at interfaces between conductor-to-conductor transitions, for example. The extent of the mismatches depends on several factors, including the mechanical and electrical variations at the transitions between the conductors of the cables. Any impedance or permittivity mismatches at the transitions can result in signal reflections, near-end and far-end interference and crosstalk, distortion, signal noise, decreased bandwidth, and other issues. Additionally, differences between the signal path and the ground return path can lead to electromagnetic wave skew, distortions, and result in additional sources for spurious mode propagation. The concepts and embodiments described herein are designed to reduce the unwanted transitional effects described above, among other unwanted effects.

In the context outlined above, various aspects and embodiments of a cable adapter are described. One example cable adapter includes an adapter insert and a housing around the adapter insert. The adapter insert includes two conductive transitions or apertures. The conductive apertures include a first aperture length, a second aperture length, and a transition between the first and second lengths. The conductive apertures include a conductive lining on inner surfaces in one example. The first aperture length can be formed to a first diameter for a first gauge of a first conductor, and the second aperture length can be formed to a second diameter for a second gauge of a second conductor. An improved transition provided by the adapter can reduce signal reflections, reduce interference and crosstalk, reduce distortion, increase signal to noise ratios, and increase bandwidth in transitions between conductors of different diameters, such as conductors of different diameters in twinax cables.

Figure 1B:
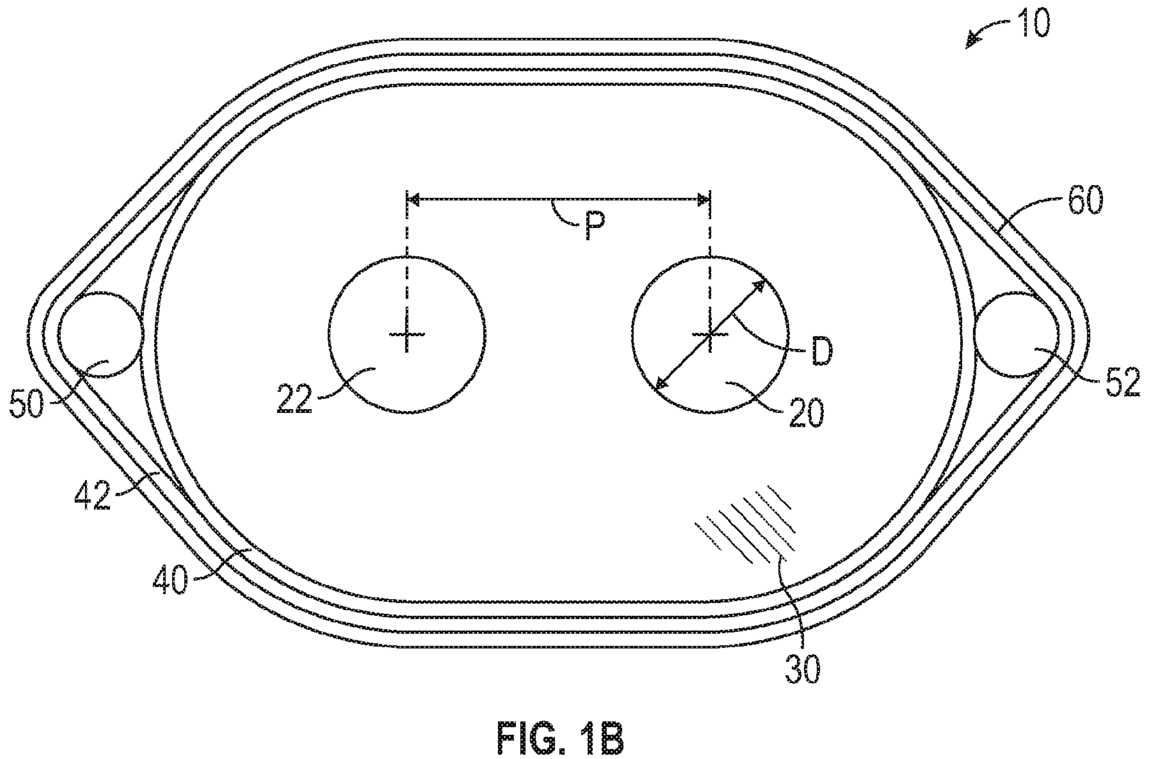
FIG. 1B illustrates a front view of the example cable shown in FIG. 1A according to various embodiments of the present disclosure.

Turning to the drawings, FIG. 1A illustrates a perspective view of an example cable 10 according to various embodiments of the present disclosure, and FIG. 1B illustrates a front view of the cable 10 shown in FIG. 1A. The cable 10 is provided as an example of an electrical interconnect capable of transmitting or propagating a high-throughput data signals. The cable 10 is illustrated as a representative example and is not drawn to any particular scale or size. The shape, size, proportion, and other characteristics of the cable 10 can vary as compared to that shown. For example, the gauge (e.g., American Wire Gauge (AWG)) of the conductors in the cable 10 can vary, among other characteristics of the cable 10. Additionally, one or more of the parts of the cable 10 can be omitted in some cases, such as one of the shielding layers, the drain conductors, or other parts, and the cable 10 can also include other parts or components that are not illustrated in FIGS. 1A and 1B.

Referring between FIGS. 1A and 1B, the cable 10 includes a first inner conductor 20, a second inner conductor 22, a dielectric insulator 30, a first shield 40, a second shield 42, a first drain conductor 50, a second drain conductor 52, and a jacket 60. The cable 10 is similar to coaxial cables but includes two inner conductors 20 and 22, rather than a single inner conductor. With two inner conductors, the cable 10 is an example of a twinaxial or twinax cable. Twinax cables such as the cable 10 can be used in short-range, high-speed differential data signaling applications, for example, although the cable 10 can be relied upon in a range of data interconnection applications.

The conductors 20 and 22 can be embodied as copper conductors, copper-clad steel conductors, or conductors formed from other metals. In some cases, the conductors 20 and 22 can include an outer-surface plating of silver or other metal. As examples, the conductors 20 and 22 can range in gauge, such as between 22-34 AWG, although the cable 10 can include conductors of other gauges. Data signals can be differentially coupled to the conductors 20 and 22, as one example, although the cable 10 can be used to communicate data using a range of modulation and signaling techniques. Additional aspects of the conductors 20 and 22 are described below.

The dielectric insulator 30 can be embodied as a core of dielectric insulating material. As examples, the dielectric insulator 30 can be embodied as a solid or low-density polyethylene (PE), polytetrafluoroethylene (PTFE), conductive PE or PTFE, fluoropolymer, or other plastic or insulating material. Example dielectric constants (Dk) of the dielectric insulator 30 can range from 1.5-3, although the cable 10 is not limited to any particular type or characteristic of insulating material. The conductors 20 and 22 are positioned within the dielectric insulator 30 as shown. The distance or spacing between the outer surface of the conductors 20 and 22 and the outer surface of the dielectric insulator 30 (i.e., at the interface between the dielectric insulator 30 and the first shield 40) can vary in the cable 10.

The first shield 40 can be embodied as a relatively thin layer of conductive material, such as aluminum, copper, or other conductive shield. The first shield 40 is positioned over and covers the outer surface of the dielectric insulator 30 in the example shown. The first and second drain conductors 50 and 52 can be embodied as aluminum, copper, or other conductors. As examples, the drain conductors 50 and 52 can range in gauge, but the drain conductors 50 and 52 are generally a larger gauge (i.e., smaller diameter) than the conductors 20 and 22. The second shield 42 can be embodied as a relatively thin layer of conductive material, such as aluminum, copper, or other conductive shield. The second shield 42 wraps around the first shield 40 and the drain conductors 50 and 52 in the example shown, with the drain conductors 50 and 52 being positioned between the first and second shields 40 and 42. The drain conductors 50 and 52 contact and are electrically coupled with both the first and second shields 40 and 42. The jacket 60 can be embodied as any suitable material capable of protecting and permitting sufficient flexibility for the cable 10, such as polyvinyl chloride (PVC), polyurethane, chlorinated PE, or other thermoplastic, thermoset, or related material.

The diameter "D" of the conductors 20 and 22 can vary depending on the gauge of the conductors 20 and 22 used in the cable 10, by definition and as understood in the field. The relative positions (e.g., the pitch "P") of the conductors 20 and 22, the overall size (e.g., thickness, width, etc.) of the cable 10, and other aspects of the cable 10 can also vary along with the gauge of the conductors 20 and 22. Thus, another cable similar to the cable 10, but including conductors of a different gauge as compared to the conductors 20 and 22, can have conductors that do not spatially align with conductors 20 and 22. The conductors of a different cable may have different diameters "D," a different pitch "P" between the conductors, a dielectric insulator of a different size, shape, or style, different positions and sizes of drain conductors, and other differences as compared to the cable 10. These differences in dimensions and other aspects can present challenges when designing an interface between the cable 10 and another cable of similar style (e.g., another twinax cable) but having conductors of a different gauge, for example, particularly at the transition between them. Similarly, a connector designed for electrical coupling at an end of the cable 10 may not be sized or dimensioned appropriately for a cable of similar style but having conductors of a different gauge.

Overall, the cable 10 can be electrically coupled and terminated at an endpoint or transitioned to another cable or connector in a variety of ways. Unwanted or undesirable effects can be imparted upon data signals communicated over the cable 10 when such terminations or transitions include impedance or permittivity mismatches, among other mismatches. These effects can include signal reflections, near-end and far-end interference and crosstalk, distortion, signal noise, decreased bandwidth, and other issues.

Figure 2A:
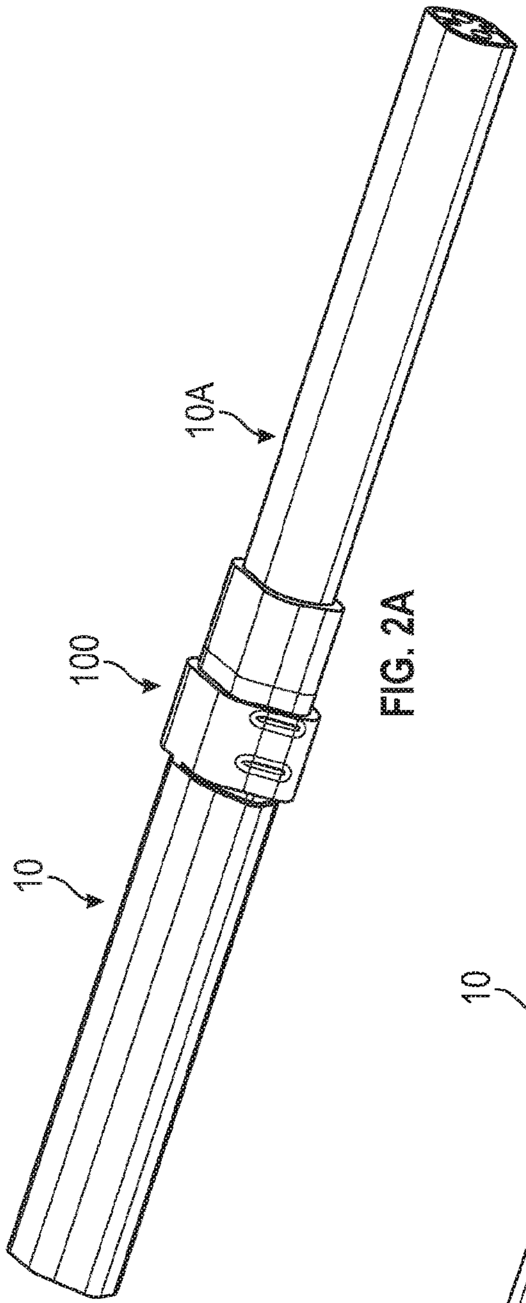
FIG. 2A illustrates an example cable adapter interposed between two cables having conductors of different gauges according to various embodiments of the present disclosure.

In the context outlined above, the cable adapters described herein provide a solution for improved terminations and transitions between the end of the cable 10, as an example, and other cables, adapters, or points of transition or termination. As one example, the cable adapters described herein provide a solution for improved termination or transition between two different twinax cables including center conductors of different gauges. FIG. 2A illustrates an example cable adapter 100. The cable adapter 100 is interposed and electrically coupled between the cable 10 and a cable 10A. The cable 10 includes conductors of a first gauge, such as 26, 28, or 29 AWG, for example, and the cable 10A includes conductors of a second gauge, such as 31 AWG. Because the 31 AWG conductors in the cable 10A have a smaller diameter than the 26, 28, or 29 AWG conductors in the cable 10, the conductors of the cable 10A do not spatially align with the conductors of the cable 10. Particularly, the conductors in the cable 10A can be offset in pitch, position, and overall size as compared to the conductors in the cable cable 10. As described in further detail below, the cable adapter 100 includes an insert with one or more conductive transitions. The conductive transitions provide an electromagnetic transition with a low impedance or permittivity mismatch between the conductors in the cable 10 and the conductors in the cable 10A.

Figure 2B:
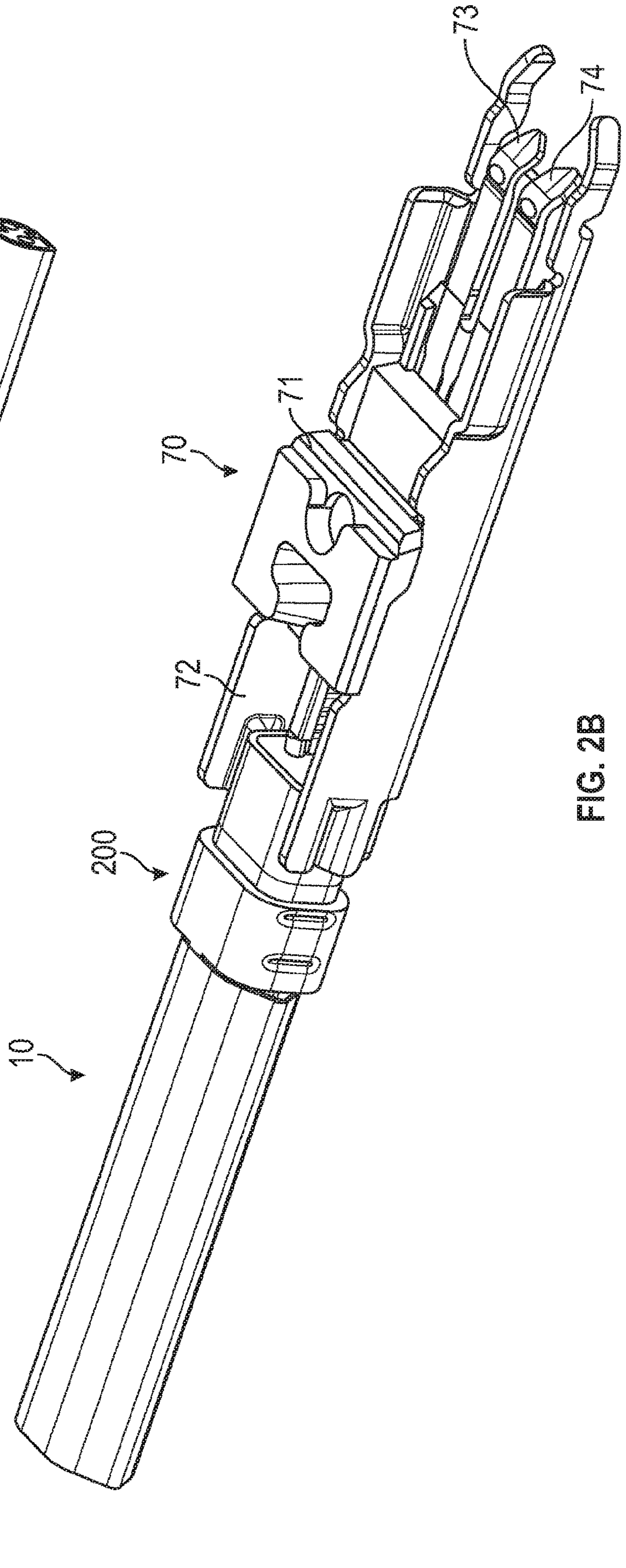
FIG. 2B illustrates an example cable adapter interposed between a cable and a cable connector according to various embodiments of the present disclosure.

FIG. 2B illustrates an example cable adapter 200. The cable adapter 200 is interposed and electrically coupled between the cable 10 and a connector 70. The connector 70 is illustrated as a representative example in FIG. 2B. The connector 70 is not drawn to any particular scale or size, and the size, shape, and style of the connector described herein can vary as compared to the examples shown. In some cases, one or more features or components of the connector 70 and the other connectors described herein can be omitted. In other cases, the connector 70 and other cable connectors described can include other features or components. In the example shown, the connector 70 includes a pin slide 71 and a connector base 72. The connector base 72 can be seated around the end of a housing of the cable adapter 200, as shown in FIG. 2B, and rest against detents projecting from the housing.

The cable 10 includes conductors of a first gauge, such as 26, 28, or 29 AWG, for example, and the connector 70 includes pins or conductors 73 and 74 of a certain size and spacing, as described in further detail below. Because the size and spacing of the conductors in the cable 10A are different than the size and spacing of the pins 73 and 74 of the connector 70, the conductors of the cable 10A do not spatially align with the pins 73 and 74 of the connector 70. The conductors in the cable 10A can be offset in pitch, position, and overall size as compared to the pins 73 and 74 of the connector 70. As described in further detail below, the cable adapter 200 includes an insert with one or more conductive transitions. The conductive transitions provide an electromagnetic transition with a low impedance or permittivity mismatch between the conductors in the cable 10 and the conductors in the cable 10A. Other examples of cable adapters with conductive transitions are described herein.

Figure 3A:
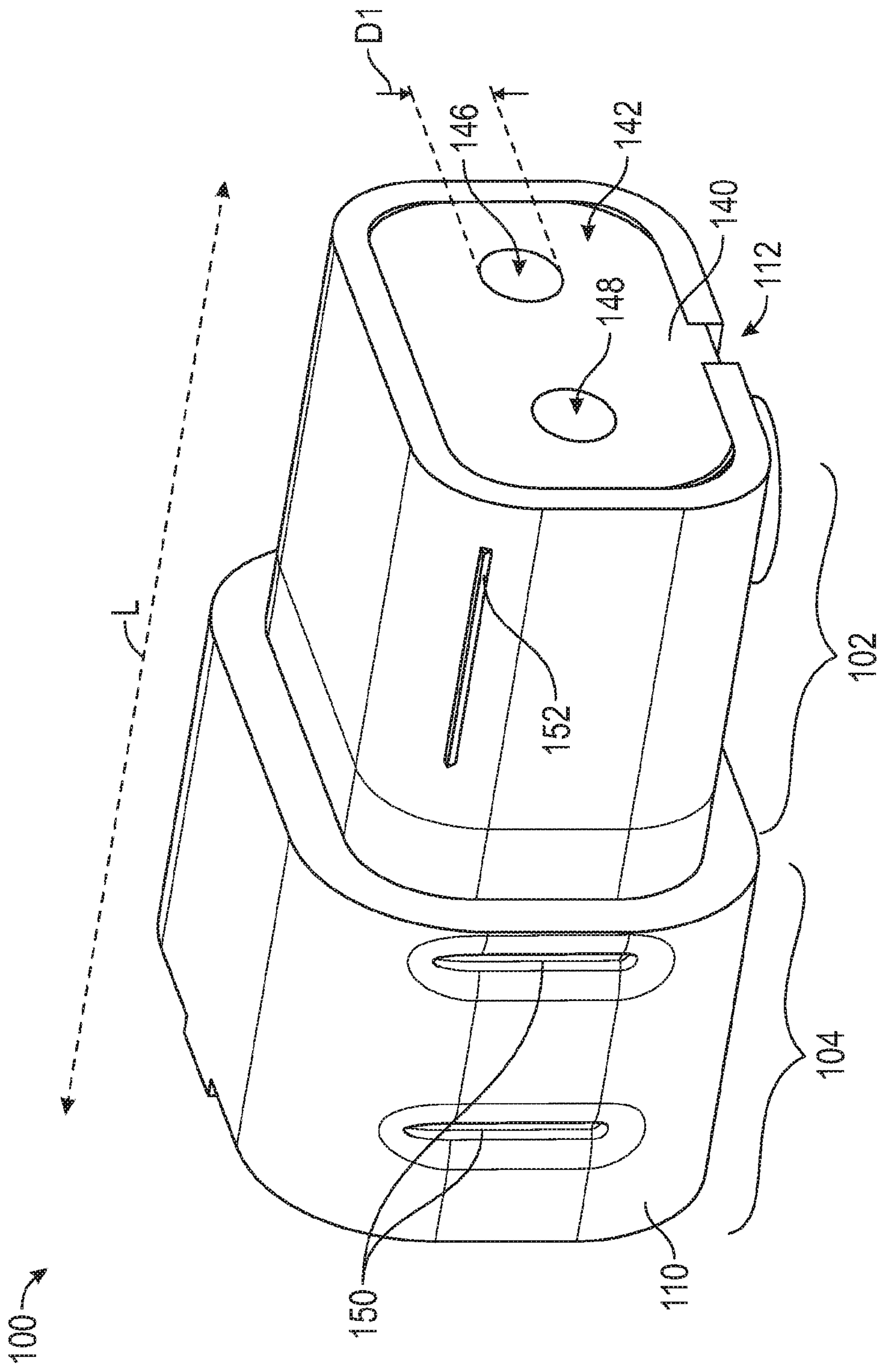
FIG. 3A illustrates a front perspective view of a cable adapter according to various embodiments of the present disclosure.
Figure 3B:
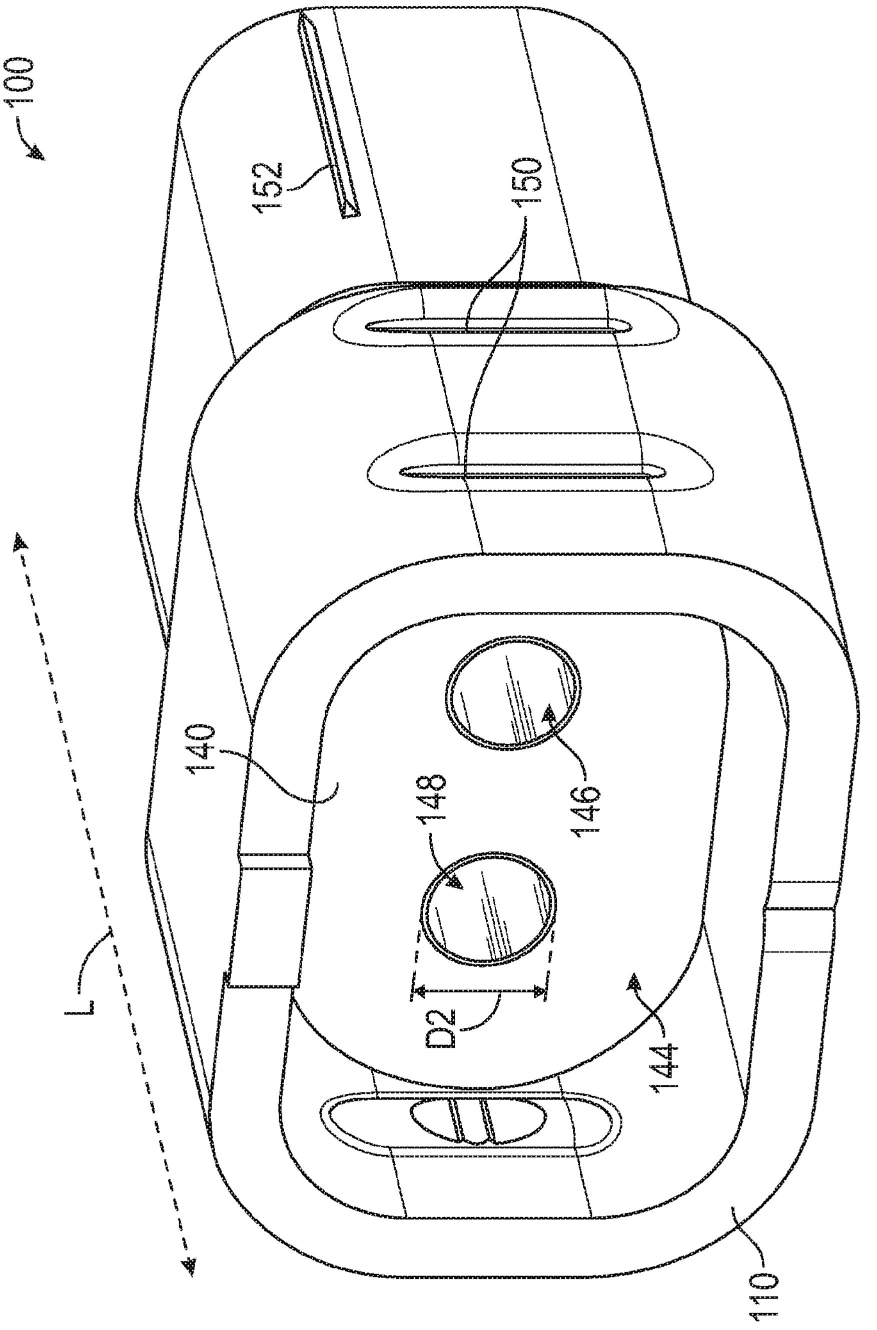
FIG. 3B illustrates a back perspective view of the cable adapter shown in FIG. 3A according to various embodiments of the present disclosure.

FIG. 3A illustrates a front perspective view of a cable adapter 100 according to various embodiments of the present disclosure, and FIG. 3B illustrates a back perspective view of the cable adapter 100. The cable adapter 100 is illustrated as a representative example in FIGS. 3A and 3B. The cable adapter 100 is not drawn to any particular scale or size, and the size, shape, and style of the cable adapters described herein can vary as compared to the examples shown. In some cases, one or more features or components of the cable adapter 100 and the other cable adapters described herein can be omitted. In other cases, the cable adapter 100 and other cable adapters described can include other features or components.

Referring between FIGS. 3A and 3B, the cable adapter 100 includes a housing 110 and an adapter insert 140 within the housing 110. The housing 110 can be formed from a conductive metal, such as aluminum, copper, or other conductive metal or metal alloy. The housing 110 wraps around and surrounds the adapter insert 140 over at least some surfaces or regions of the adapter insert 140, as shown, for impedance control and crosstalk isolation. In some cases, the housing 110 can include a conductive plating on its outer surfaces. The adapter insert 140 can be formed from a dielectric insulating material, such as a fluoropolymer, PE, PTFE, or other plastic, or other insulating material. An example Dk of the dielectric insulator can range from 1.5-3, although the adapter insert 140 is not limited to any particular type or characteristic of insulating material.

The housing 110 wraps around the adapter insert 140. The housing 110 can surround the adapter insert 140 along the longitudinal axis "L" of the cable adapter 100 or along at least some lengths or segments of the longitudinal axis "L". The housing 110 may not surround the adapter insert 140 along the entire length of the cable adapter 100 in all cases, however, and the housing 110 includes a gap 112 in the example shown in FIG. 3A. A locking feature of the adapter insert 140 is positioned within the gap 112, as shown, and that feature is described in further detail below.

The housing 110 includes a first casing region 102 and a second casing region 104 with a first opening at one end of the first casing region 102 and a second opening at one end of the second casing region 104. The profile of the housing 110 (i.e., taken in a plane orthogonal to the longitudinal axis "L" of the cable adapter 100) is rectangular in shape, with curved corners, as shown, although the profile of the housing 110 can vary. The profile of the first casing region 102 is relatively smaller than the profile of the second casing region 104, such that the opening at the end of the first casing region 102 is smaller than the opening at the end of the second casing region 104. The second casing region 104 is dimensioned to be large enough for the partial insertion of a cable, such as the cable 10, into the back of the housing 110, where the cable 10 can be secured with the cable adapter 100.

The housing 110 includes indents 150 on one side of the second casing region 104, as shown in FIGS. 3A and 3B, and similar indents on the other side of the housing 110. The indents 150 can provide a surface for gripping the cable adapter 100. On the inner surface of the housing 110, the indents 150 can also provide surfaces for crimping or affixing drain conductors of twinax cable, such as the drain conductors 50 and 52 of the cable 10 shown in FIGS. 1A and 1B.

The housing 110 also includes a detent 152 on one side of the first casing region 102, as shown in FIGS. 3A and 3B, and a similar detent on the other side of the housing 110. The detent 152 can provide a stop for securing a cable connector around the front end of the housing 110. Additional features of the housing 110 are described below.

The adapter insert 140 includes a front surface 142 and a back surface 144. The adapter insert 140 also includes apertures 146 and 148, which extend from the front surface 142 to the back surface 144. Thus, the adapter insert 140 includes openings at the front surface 142 for the apertures 146 and 148 and openings at the back surface 144 for the apertures 146 and 148. The apertures 146 and 148 are circular, as shown in FIGS. 3A and 3B, for the insertion of conductors into the apertures 146 and 148, as described in further detail below. The apertures 146 and 148 can, at least in part, be formed in other shapes, and examples of other shapes and styles of apertures are described below. In other examples, the adapter insert 140 can include additional apertures, such as three, four, or more apertures, each similar to the apertures 146 and 148. The apertures 146 and 148 can include a lining of conductive material, as described below.

The apertures 146 and 148 include a transition from a first diameter "D1" (see FIG. 3A) or size at the front surface 142 to a second diameter "D2" (see FIG. 3B) or size at the back surface 144. Thus, the apertures 146 and 148 are conductive transitions in the adapter insert 140. In the example shown, the sizes of the openings in the front surface 142 are smaller in diameter than the sizes of the openings at the back surface 144 (i.e., "D1"<"D2"). The apertures 146 and 148 also include a conductive lining on at least a region or length of the inner surface of the apertures 146 and 148 within the adapter insert 140. These and other aspects of the adapter insert 140 are described below with reference to FIGS. 4A and 4B.

The adapter insert 140 extends within the housing 110 from the front of the cable adapter 100, where the front surface 142 is coplanar with the front edge of the housing 110 as shown in FIG. 3A, to a position within the housing. The back surface 144 of the adapter insert 140 does not extend to be coplanar with the back edge of the housing 110. Instead, the back surface 144 is recessed from the back edge of the housing 110 as shown in FIG. 3B. Thus, the cable 10, for example, can be inserted within the housing 110 at the back of the housing 110, where it can be secured with the cable adapter 100. In some cases, the adapter insert 140 can be shorter along the longitudinal axis "L," such that the front surface 142 of the adapter insert 140 is not coplanar with the front edge of the housing 110. In that case, the front surface 142 can be recessed from the front edge of the housing 110. Another cable can be inserted within the housing 110 at the front of the housing 110, where it can be secured with the cable adapter 100. In other cases, a connector similar to the connector 70 shown in FIG. 2B, among other styles of connectors, can be secured to the cable adapter 100 at the front of the housing 110. The connector base 72 of the connector 70 (see FIG. 2B) can be seated around the front of the housing 110 and rest against the detents 152 projecting from the housing 110.

Figure 4A:
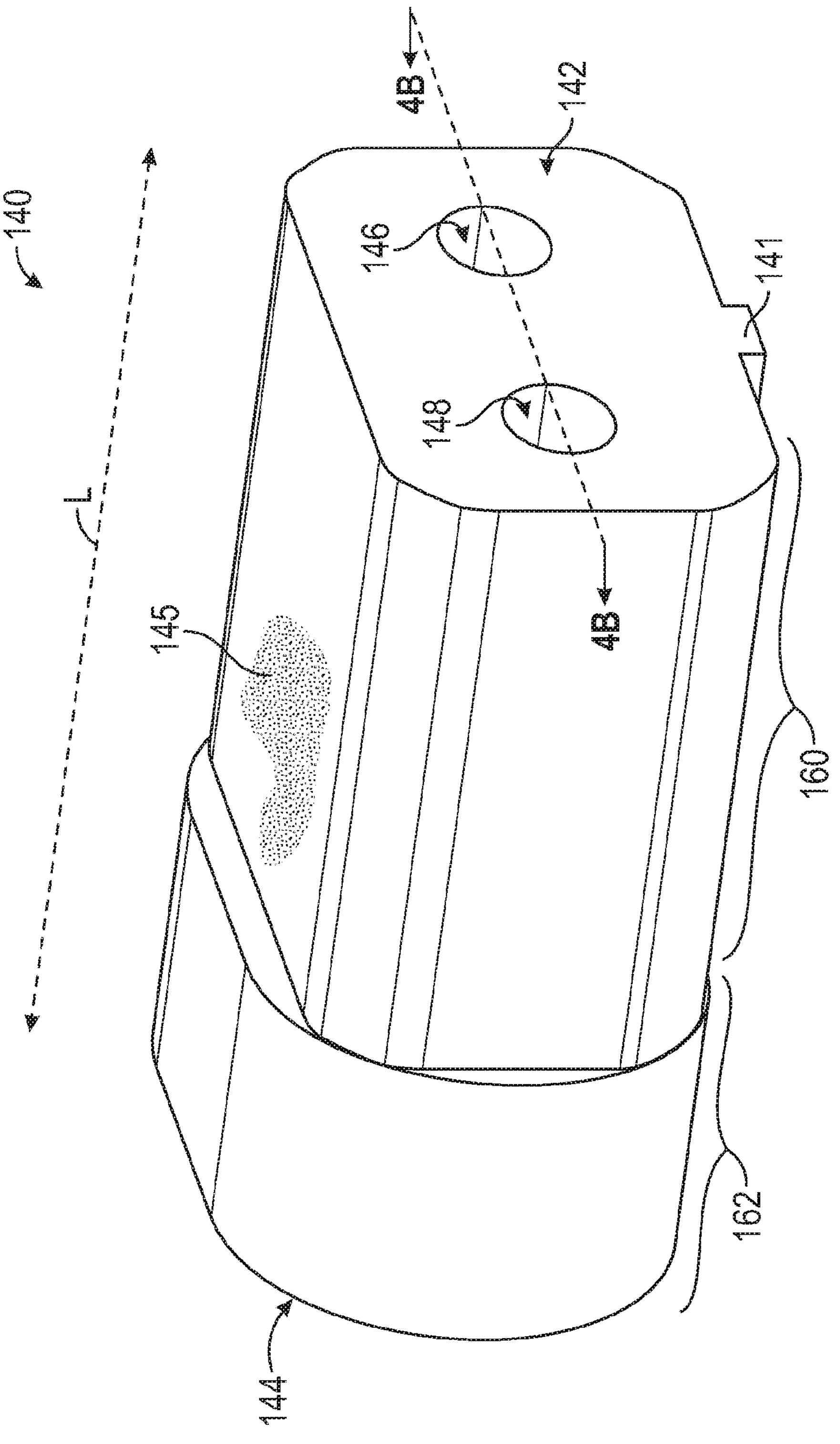
FIG. 4A illustrates a perspective view of an adapter insert for the cable adapter shown in FIG. 3A according to various embodiments of the present disclosure.
Figure 4B:
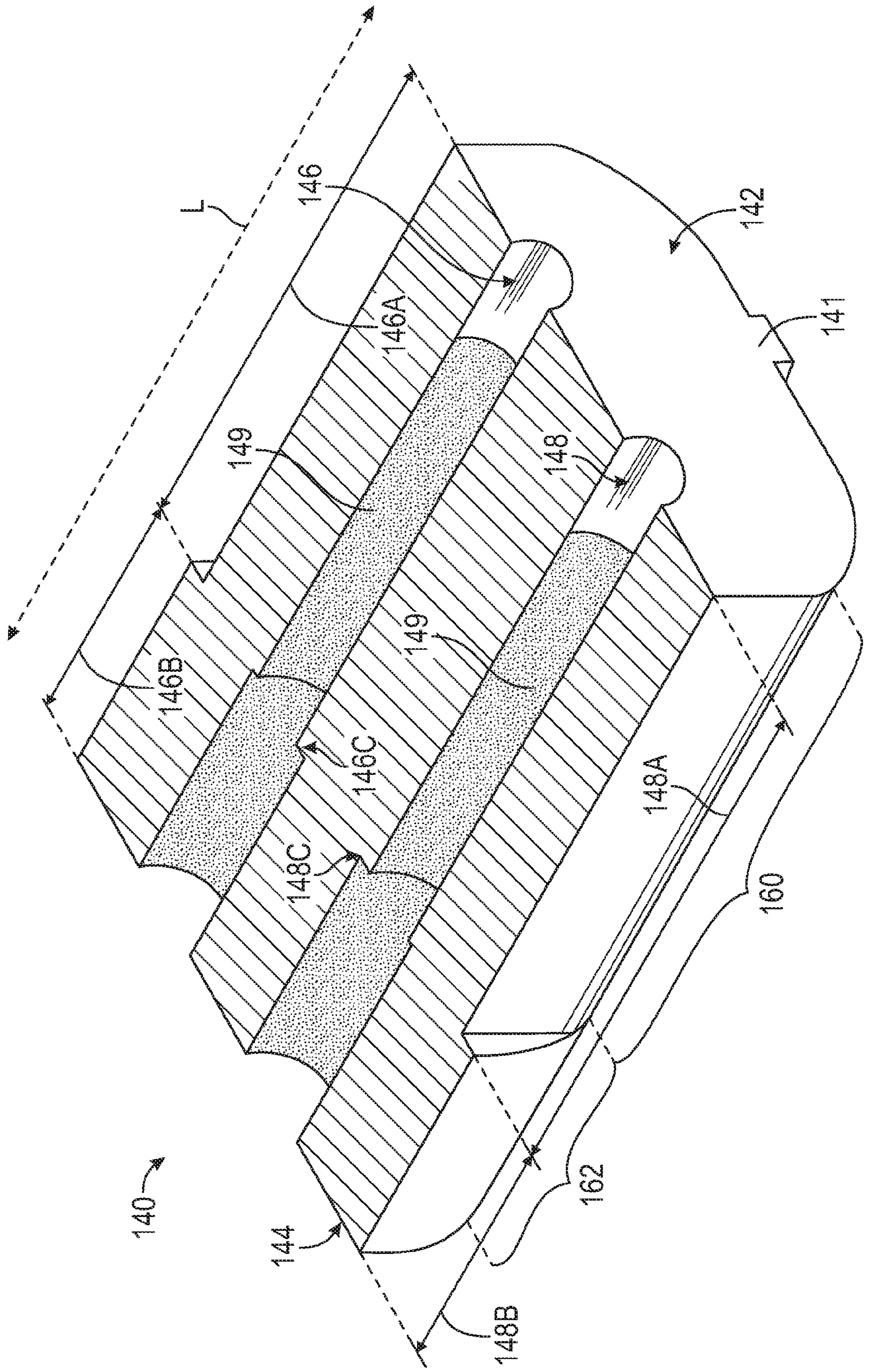
FIG. 4B illustrates the cross-sectional view the adapter insert designated in FIG. 4A according to various embodiments of the present disclosure.

FIG. 4A illustrates a perspective view of the adapter insert 140 for the cable adapter 100 shown in FIG. 3A, and FIG. 4B illustrates the cross-sectional view the adapter insert 140 designated in FIG. 4A. The adapter insert 140 is sized and shaped to fit within the housing 110, with only a minimal clearance (e.g., little to no air gap) between them. The adapter insert 140 can be inserted into the housing 110 from the back of the housing 110. The adapter insert 140 includes a first adapter region 160 and a second adapter region 162. The profile of the first adapter region 160 (i.e., taken in a plane orthogonal to the longitudinal axis "L" of the adapter insert 140) is rectangular in shape, with curved corners, as shown, although the profile of the first adapter region 160 can vary. The profile of the second adapter region 162 is rectangular in shape, with semi-circular sides, as shown, although the profile of the second adapter region 162 can vary. The profile of the first adapter region 160 is relatively smaller than the profile of the second adapter region 162. The adapter insert 140 also includes an interlock feature 141, which can be formed as a ridge that extends along at least a part of the bottom of the adapter insert 140. The interlock feature 141 is sized and shaped to fit within the gap 112 of the housing 110, as shown in FIG. 3A, to help secure and position the adapter insert 140 with the housing 110.

FIG. 4B illustrates the extension of the apertures 146 and 148 from the front surface 142 to the back surface 144 of the adapter insert 140. The aperture 146 includes a first aperture length 146A and a second aperture length 146B, with a transition 146C at the interface between the first aperture length 146A and the second aperture length 146B. The aperture 148 includes a first aperture length 148A and a second aperture length 148B, with a transition 148C at the interface between the first aperture length 148A and the second aperture length 148B. The first aperture length 146A is sized to a first diameter, and the second aperture length 146B is sized to a second diameter. The first aperture length 148A is also sized to the same first diameter, and the second aperture length 148B is also sized to the same second diameter. The second diameter is larger than the first diameter.

The internal diameters of the aperture length 146A, the aperture length 146B, the aperture length 148A, and the aperture length 148B can be selected based on the types of cables used with the cable adapter 100 and particularly to accommodate the gauges of the conductors in the cables. As one example, the back of the cable adapter 100 can be fitted at the end of the cable 10 shown in FIGS. 1A and 1B. The diameter "D" of the conductors 20 and 22 in the cable 10 can vary depending on the gauge of the conductors 20 and 22. Similarly, the relative positions of the conductors 20 and 22 within the cable 10 and other aspects of the cable 10 can also vary based on the gauge of the conductors 20 and 22. Thus, the diameters of the aperture lengths 146B and 148B can be selected to accommodate the conductors 20 and 22 of the cable 10, with only a minimal clearance (e.g., little to no air gap) between the outer surfaces of the conductors 20 and 22 and the inner surfaces of the aperture lengths 146B and 148B, when the conductors 20 and 22 are inserted into the aperture lengths 146B and 148B. The pitch or spacing between the centers of the openings of the aperture lengths 146B and 148B at the back surface 144 of the adapter insert 140 can also be aligned with the pitch of spacing of the conductors 20 and 22 of the cable 10.

The front of the cable adapter 100 can be fitted to another cable, such as the cable 10A shown in FIG. 2A, having conductors of a larger gauge (i.e., smaller diameter) than the conductors 20 and 22 of the cable 10. The conductors of the cable 10A may have different diameters "D," a different pitch "P" between the conductors, and other differences as compared to the cable 10. Thus, the diameters of the aperture lengths 146A and 148A can be selected to accommodate the smaller conductors of the cable 10A, with only a minimal clearance (e.g., little to no air gap) between the outer surfaces of the conductors and the inner surfaces of the aperture lengths 146A and 148A, when the conductors of the cable 10A are inserted into the aperture lengths 146A and 148A. The pitch or spacing between the centers of the openings of the aperture lengths 146A and 148A at the front surface 142 of the adapter insert 140 can also be aligned with the pitch of spacing of the conductors of the cable 10A.

The inner surfaces of the apertures 146 and 148 include a lining of conductive material 149, which extends along at least a length of the apertures 146 and 148 and across the transitions 146C and 148C. Thus, the apertures 146 and 148 are conductive apertures. The lining of conductive material 149 can include a lining of one or more metal layers, metal alloy layers, sintered metal particle layers, or other layers of conductive material. The lining of conductive material 149 can be deposited or otherwise formed in a number of ways, such as by chemical or physical vapor deposition, sputtering, evaporation, plating, spin coating, dip coating, epitaxial growth, or other techniques. The metal, metal alloy, or metal particle layers can include copper, silver, gold, titanium, platinum, tungsten, or other metals and alloys thereof. In some cases, the lining of conductive material 149 can include a series of raised ridges, bumps, or other patterns of the conductive material along the length of the apertures 146 and 148, where the thickness of the conductive material lining varies in thickness.

In some cases, the outer surface along the length of the adapter insert 140 can also include a lining of conductive material 145. The lining of conductive material 145 can include a lining of one or more metal layers, metal alloy layers, sintered metal particle layers, or other layers of conductive material. When the adapter insert 140 is assembled and positioned within the housing 110, the lining of conductive material 145 can make electrical contact with the housing 110. The lining of conductive material 145 can be the same type of metal or metal layers as the lining of conductive material 149, or the lining of conductive material 145 can be a different type of material as compared to the lining of conductive material 149. The lining of conductive material 149 can be deposited or otherwise formed in a number of ways, such as by chemical or physical vapor deposition, sputtering, evaporation, plating, spin coating, dip coating, epitaxial growth, or other techniques. The metal, metal alloy, or metal particle layers can include copper, silver, gold, titanium, platinum, tungsten, or other metals and alloys thereof. The front surface 142 and the back surface 144 of the adapter insert 140 can be free of the conductive material 145.

Figure 5:
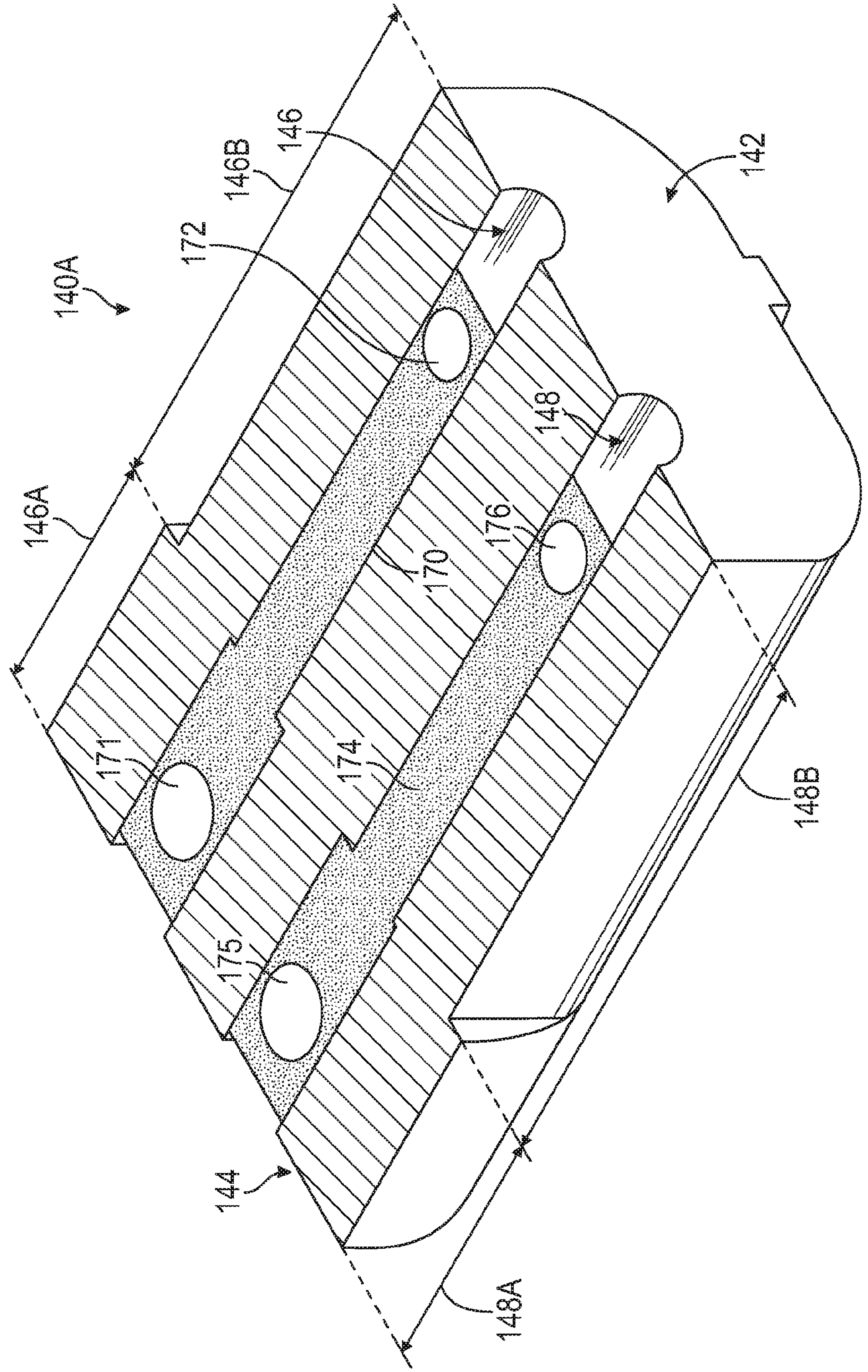
FIG. 5 illustrates a cross-sectional view of another adapter insert according to various embodiments of the present disclosure.

FIG. 5 illustrates a cross-sectional view of another adapter insert 140A according to various embodiments of the present disclosure. The adapter insert 140A is similar to the adapter insert 140 shown in FIGS. 4A and 4B, but the adapter insert 140A does not include the lining of conductive material 149 within the apertures 146 and 148. Instead, the adapter insert 140A includes a conductive insert 170 placed within the aperture 146 and a conductive insert 174 placed within the aperture 148. The conductive inserts 170 and 174 can be embodied as strips or thin plates of metal or metal alloy, such as copper or other conductive metals, which have been stamped or sheered out of a larger sheet of material. The conductive inserts 170 and 174 can be plated in some cases, such as plated with silver or other plating. In one example, the width of the conductive inserts 170 and 174 can be close to, but less than, the diameters of the apertures 146 and 148, so that the conductive inserts 170 and 174 fit and seat within the apertures 146 and 148. The conductive inserts 170 and 174 can be formed to any suitable thickness in relation to the size of the apertures 146 and 148.

The conductive inserts 170 and 174 are sized and shaped to fit within the apertures 146 and 148. The conductive insert 170 includes a first insert length that runs along the first aperture length 146A and a second insert length that runs along the second aperture length 146B. The first insert length of the conductive insert 170 is wider than the second insert length of the conductive insert 170, as shown in FIG. 5, corresponding to the shape of the aperture 146. The conductive insert 174 includes a first insert length that runs along the first aperture length 148A and a second insert length that runs along the second aperture length 148B. The first insert length of the conductive insert 174 is wider than the second insert length of the conductive insert 174, corresponding to the shape of the aperture 146. The conductive inserts 170 and 174 can be inserted within the apertures 146 and 148, respectively, from the back surface 144 of the adapter insert 140A.

The conductive insert 170 includes an eyelet 171 positioned at one end toward the back surface 144 of the adapter insert 140A and an eyelet 172 positioned at another end toward the front surface 142 of the adapter insert 140A. The conductive insert 174 includes an eyelet 175 positioned at one end toward the back surface 144 of the adapter insert 140A and an eyelet 176 positioned at another end toward the front surface 142 of the adapter insert 140A. When conductors are inserted into the apertures 146 and 148, from the back surface 144 of the adapter insert 140A, the conductors can fit into the eyelets 171 and 175 to help secure and electrically couple them to the conductive inserts 170 and 174. In some cases, the conductors can be electrically coupled to the conductive inserts 170 and 174 using solder, welds, or other connection techniques. When conductors are inserted into the apertures 146 and 148, from the front surface 142 of the adapter insert 140A, the conductors can fit into the eyelets 172 and 176 to help secure and electrically couple them to the conductive inserts 170 and 174. In some cases, the conductors can be electrically coupled to the conductive inserts 170 and 174 using solder, welds, or other connection techniques.

Figure 6:
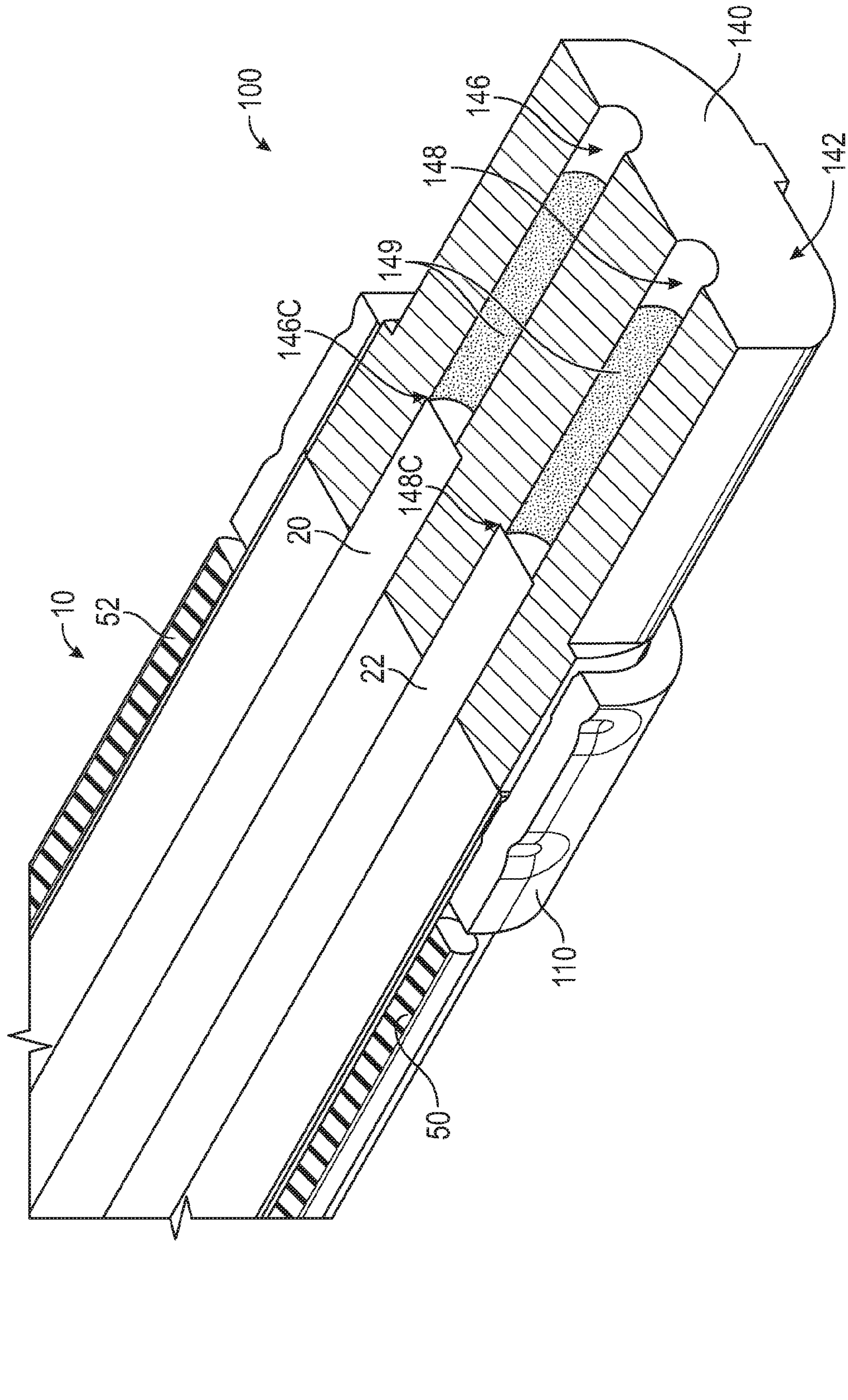
FIG. 6 illustrates a cross-sectional view of the cable adapter shown in FIG. 3A with a cable according to various embodiments of the present disclosure.

FIG. 6 illustrates a cross-sectional view of the cable adapter 100 shown in FIG. 3A with the cable 10 according to various embodiments of the present disclosure. As shown, the conductors 20 and 22 of the cable 10 extend into the apertures 146 and 148 from the back 144 of the adapter insert 140. The conductors 20 and 22 can be inserted into the adapter insert 140 such that the distal ends of the conductors 20 and 22 end at the transitions 146C and 148C of the apertures 146 and 148, respectively, as shown. In other cases, the conductors 20 and 22 can be inserted to other distances within the apertures 146 and 148. The conductors 20 and 22 make electrical contact with the lining of conductive material 149, which extends along the apertures 146 and 148. The drain conductors 50 and 52 are illustrated to extend up to the housing 110, but the drain conductors 50 and 52 can extend further that that illustrated and within (e.g., under) the housing 110. Thus, the drain conductors 50 and 52 contact and are electrically coupled to the housing 110.

Although not shown in FIG. 6, additional conductors, such as conductors of the cable 10A (see FIG. 2A), can extend into the apertures 146 and 148 from the front surface 142 of the adapter insert 140. The conductors of the cable 10A will also make electrical contact with the lining of conductive material 149. The conductors of the cable 10A can be inserted into the adapter insert 140 such that the distal ends of the conductors end at the transitions 146C and 148C of the apertures 146 and 148, abutting the conductors 20 and 22 at the transitions 146C and 148C. The lining of conductive material 149 will thus electrically couple the conductors 20 and 22 of the cable 10 and the conductors of the cable 10A.

The cable adapter 100 provides an electrical coupling and transition between the conductors of the cables 10 and 10A, although the conductors of the cables 10 and 10A have different diameters and pitches. The electrical coupling provided by the cable adapter 100 provides an improved impedance or permittivity transition between the conductors of the cables 10 and 10A, as compared to other techniques for coupling the conductors, such as other styles of connectors and interconnection techniques. The cable adapter 100 helps to reduce the unwanted or undesirable effects that can be imparted upon data signals communicated over the cables 10 and 10A when the conductors in the cables 10 and 10A are electrically coupled together. As examples, the improved transition provided by the cable adapter 100 can reduce signal reflections, reduce interference and crosstalk, reduce distortion, increase signal to noise ratios, and increase bandwidth in transitions between conductors of different diameters, such as conductors of different diameters in twinax cables.

Figure 7:
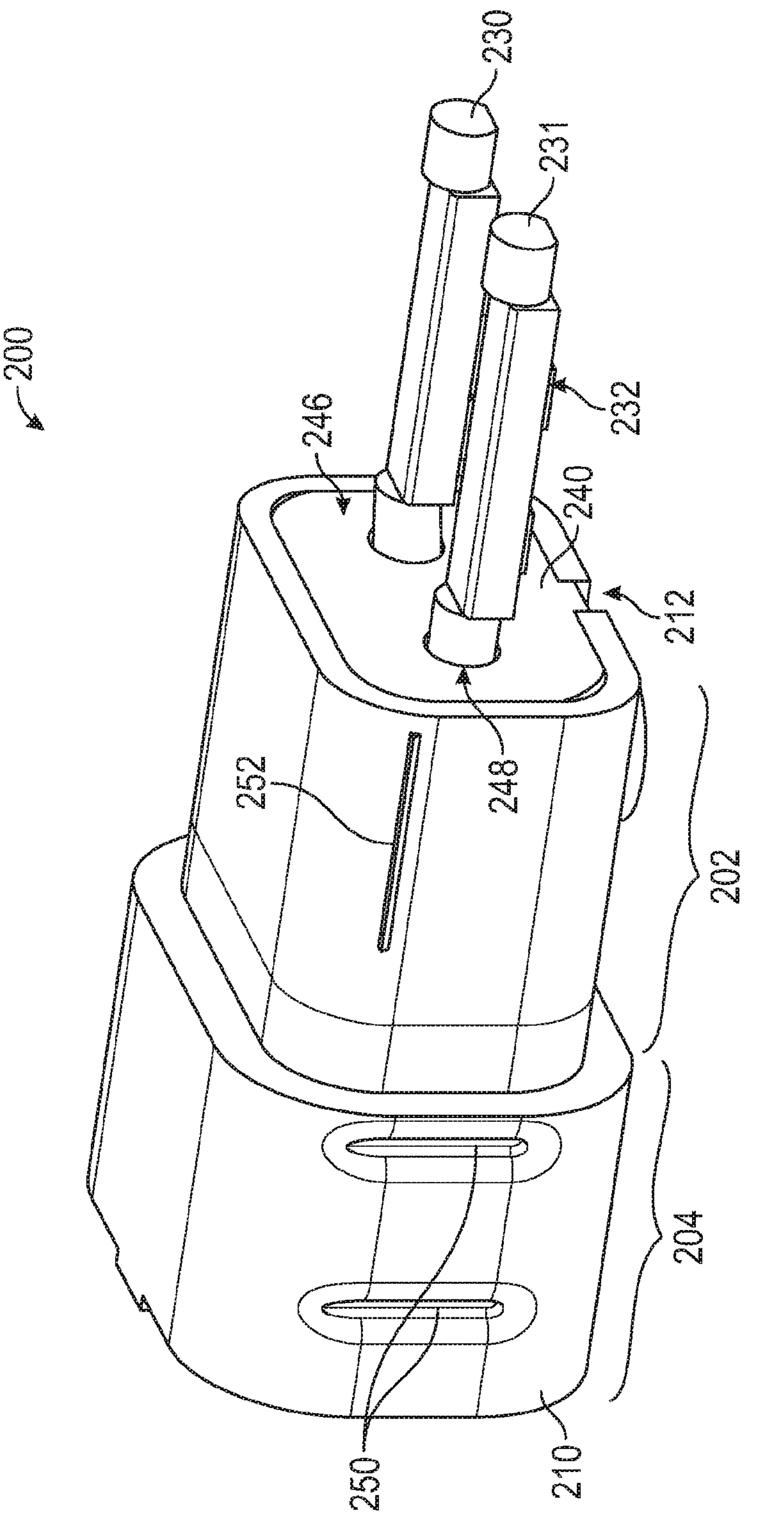
FIG. 7 illustrates a front perspective view of another cable adapter according to various embodiments of the present disclosure.

FIG. 7 illustrates a front perspective view of another cable adapter 200 according to various embodiments of the present disclosure. The cable adapter 200 includes a housing 210 and an adapter insert 240 within the housing 210. The housing 210 is similar to the housing 110 of the cable adapter 100 and can be formed from a conductive metal, such as aluminum, copper, or other conductive metal or metal alloy. In some cases, the housing 210 can include a conductive plating on its outer surfaces. The adapter insert 240 can be formed from a dielectric insulating material, such as a fluoropolymer, PE, PTFE, or other plastic or insulating material. An example Dk of the dielectric insulator can range from 1.5-3, although the adapter insert 240 is not limited to any particular type or characteristic of insulating material.

The housing 210 wraps around the adapter insert 240. The housing 210 can surround the adapter insert 240 along the longitudinal axis of the cable adapter 200 or along at least some segments or lengths of the longitudinal axis. The housing 210 may not surround the adapter insert 240 along the entire length of the cable adapter 200 in all cases, however, and the housing 210 includes a gap 212 in the example shown in FIG. 7. An interlocking or positioning feature of the adapter insert 240 is positioned within the gap 212, as shown, and that feature is described in further detail below.

The housing 210 includes a first casing region 202 and a second casing region 204. The profile of the housing 210 (i.e., taken in a plane orthogonal to the longitudinal axis of the cable adapter 200) is rectangular in shape, with curved corners, as shown, although the profile of the housing 210 can vary. The profile of the first casing region 202 is relatively smaller than the profile of the second casing region 204. The second casing region 204 is dimensioned to be large enough for the partial insertion of a cable, such as the cable 10, into the back of the housing 210, where the cable 10 can be secured with the cable adapter 200.

The housing 210 includes indents 150 on one side of the second casing region 204, as shown in FIG. 7, and similar indents on the other side of the housing 210. The indents 150 can provide a surface for gripping the cable adapter 200. On the inner surface of the housing 210, the indents 150 can also provide surfaces for crimping or affixing drain conductors of twinax cable, such as the drain conductors 50 and 52 of the cable 10 shown in FIGS. 1A and 1B. The housing 210 also includes a detent 252 on one side of the first casing region 202, as shown in FIG. 7, and a similar detent on the other side of the housing 210. The detent 252 can provide a stop for securing a cable connector around the front end of the housing 210.

The adapter insert 240 also includes apertures 246 and 248, which extend from the front surface to the back surface of the adapter insert 240. Thus, the adapter insert 240 includes openings at the front surface the apertures 246 and 248 and openings at the back surface for the apertures 246 and 248. The apertures 246 and 248 are circular, as shown in FIG. 7, for the insertion of conductors or conductive posts into the apertures 246 and 248, as described in further detail below. The apertures 246 and 248 can, at least in part, be formed in other shapes, and examples of other shapes and styles of apertures are described below.

Consistent with the concepts described herein, the apertures 246 and 248 include a transition from a first diameter or size at the front surface of the adapter insert 240 to a second diameter or size at the back surface of the adapter insert 240. The apertures 246 and 248 also include a lining of conductive material 249 (see FIG. 7) on at least a region or length of the inner surface of the apertures 246 and 248 within the adapter insert 240, similar to the lining of conductive material 149 described above.

The adapter insert 240 extends within the housing 210 from the front of the cable adapter 200, where the front surface of the adapter insert 240 is coplanar with the front edge of the housing 210 as shown in FIG. 7, to a position within the housing. The back surface of the adapter insert 240 does not extend to be coplanar with the back edge of the housing 210 in all cases. Instead, the back surface can be recessed from the back edge of the housing 210. Thus, the cable 10, for example, can be inserted within the housing 210 at the back of the housing 210, where it can be secured with the cable adapter 200. In some cases, the front surface of the adapter insert 240 is not coplanar with the front edge of the housing 210. In that case, the front surface can be recessed from the front edge of the housing 210. A connector similar to the connector 70 shown in FIG. 2B, among other styles of connectors, can be secured to the cable adapter 200 at the front of the housing 210. The connector base 72 of the connector 70 (see FIG. 2B) can be seated around the front of the housing 210 and rest against the detents 252 projecting from the housing 210.

The cable adapter 200 also includes conductive posts 230 and 231, which extend in part within the apertures 246 and 248 of the adapter insert 240 and also extend in part outside or beyond the adapter insert 240. The conductive posts 230 and 231 include surface regions, such as the bottom surface region 232 of the conducive post 231, for making electrical contact with a pin of a connector, as described in further detail below with reference to FIG. 8. The conductive posts 230 and 231 can be formed from copper or other metal or metal alloy conductors. In some cases, the conductive posts 230 and 231 can include an outer-surface plating of silver or other metal.

Figure 8:
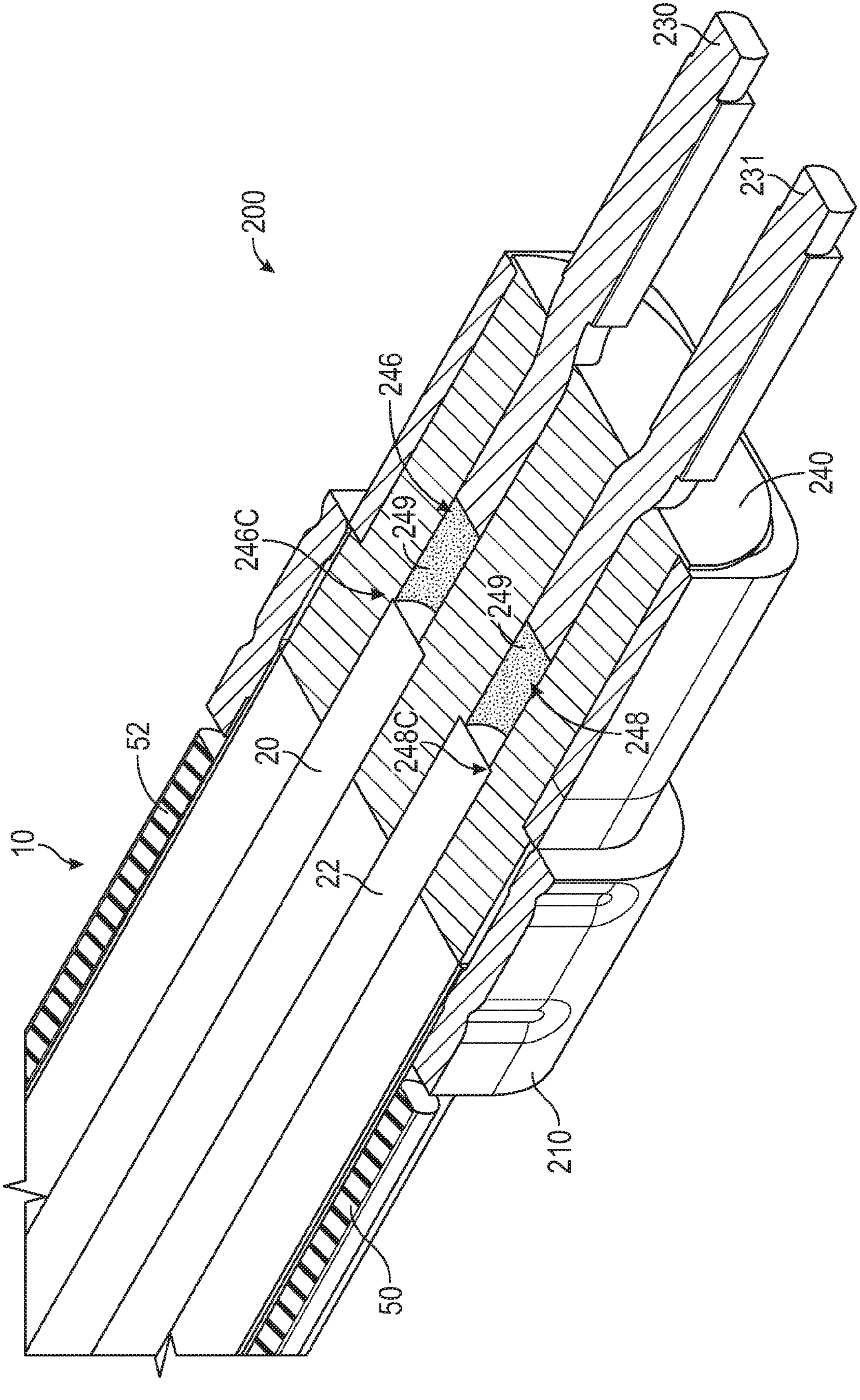
FIG. 8 illustrates a cross-sectional view of the cable adapter shown in FIG. 7 with a cable according to various embodiments of the present disclosure.

FIG. 8 illustrates a cross-sectional view of the cable adapter 200 shown in FIG. 7 with a cable 10 according to various embodiments of the present disclosure. As shown, the conductors 20 and 22 of the cable 10 extend into the apertures 246 and 248 from the back of the adapter insert 240. The conductors 20 and 22 can be inserted into the adapter insert 240 such that the distal ends of the conductors 20 and 22 end at the transitions 246C and 248C of the apertures 246 and 248, respectively, as shown. In other cases, the conductors 20 and 22 can be inserted to other distances within the apertures 246 and 248. The conductors 20 and 22 make electrical contact with the lining of conductive material 249, which extends along the apertures 246 and 248. The drain conductors 50 and 52 are illustrated to extend up to the housing 210, but the drain conductors 50 and 52 can extend further that that illustrated and within (e.g., under) the housing 210. Thus, the drain conductors 50 and 52 contact and are electrically coupled to the housing 210.

The conductive posts 230 and 231 extend into the apertures 246 and 248 from the front of the adapter insert 240. The conductive posts 230 and 231 also make electrical contact with the lining of conductive material 249. The lining of conductive material 249 will thus electrically couple the conductors 20 and 22 of the cable 10 and the conductive posts 230 and 231.

The cable adapter 200 provides an electrical coupling and transition between the conductors 20 and 22 of the cable 10 and the conductive posts 230 and 231, although the sizes and positions of the conductors 20 and 22 and the conductive posts 230 and 231 are different, as shown in FIG. 7. The electrical coupling provided by the cable adapter 200 provides an improved impedance or permittivity transition between the conductor 20 and 22 of the cable 10 and the conductive posts 230 and 231, as compared to other techniques. The cable adapter 200 helps to reduce the unwanted or undesirable effects related to impedance or permittivity mismatches, among other undesirable electrical properties. As examples, the improved transition provided by the cable adapter 200 helps to reduce signal reflections, increased interference and crosstalk, increased distortion, decreased signal to noise ratios, decreased bandwidth, and other issues.

Figure 9:
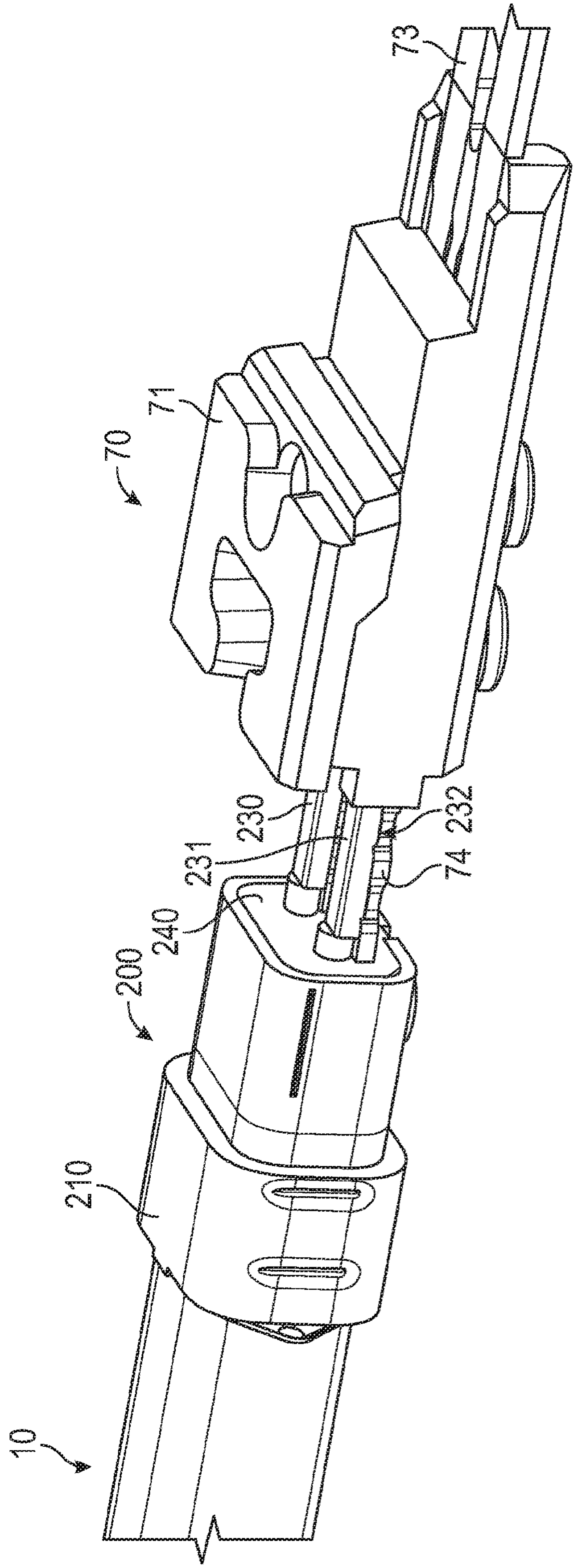
FIG. 9 illustrates a perspective view of the cable adapter shown in FIG. 2B with a cable and parts of a connector according to various embodiments of the present disclosure.

FIG. 9 illustrates a perspective view of the cable adapter 200 shown in FIG. 7 with a cable 10 and parts of the connector 70 according to various embodiments of the present disclosure. In FIG. 9, the connector base 72 of the connector 70 (see FIG. 2B) is omitted from view so that other features can be shown, including the conductors 73 and 74 of the connector 70. The connector 70 can be a standard form factor, with a spacing between the conductors 73 and 74 that matches the spacing between the conductive posts 230 and 231. The top surfaces of the conductors 73 and 74 of the connector 70 are shown to contact the bottom surfaces of the conductive posts 230 and 231. The bottom surface region 232 of the conducive post 231 contacts the top surface of the conductor 74, as shown, and the bottom surface of the conducive post 233 contacts the top surface of the conductor 73. In some cases, solder or other electrical coupling means can also be used to electrically couple the conductive posts 230 and 231 with the conductors 73 and 74.

The cable adapter 200 provides an electrical coupling and transition between the conductors 20 and 22 of the cable 10 and the conductive posts 230 and 231, inside cable adapter 200, while also providing the conductive posts 230 and 231 at a spacing to match the standard form factor of the connector 70. Other cable adapters similar to the cable adapter 200 can be relied upon to provide a transition for cables other than the cable 10 to the standard spacing and form factor of the connector 70.

Figure 10:
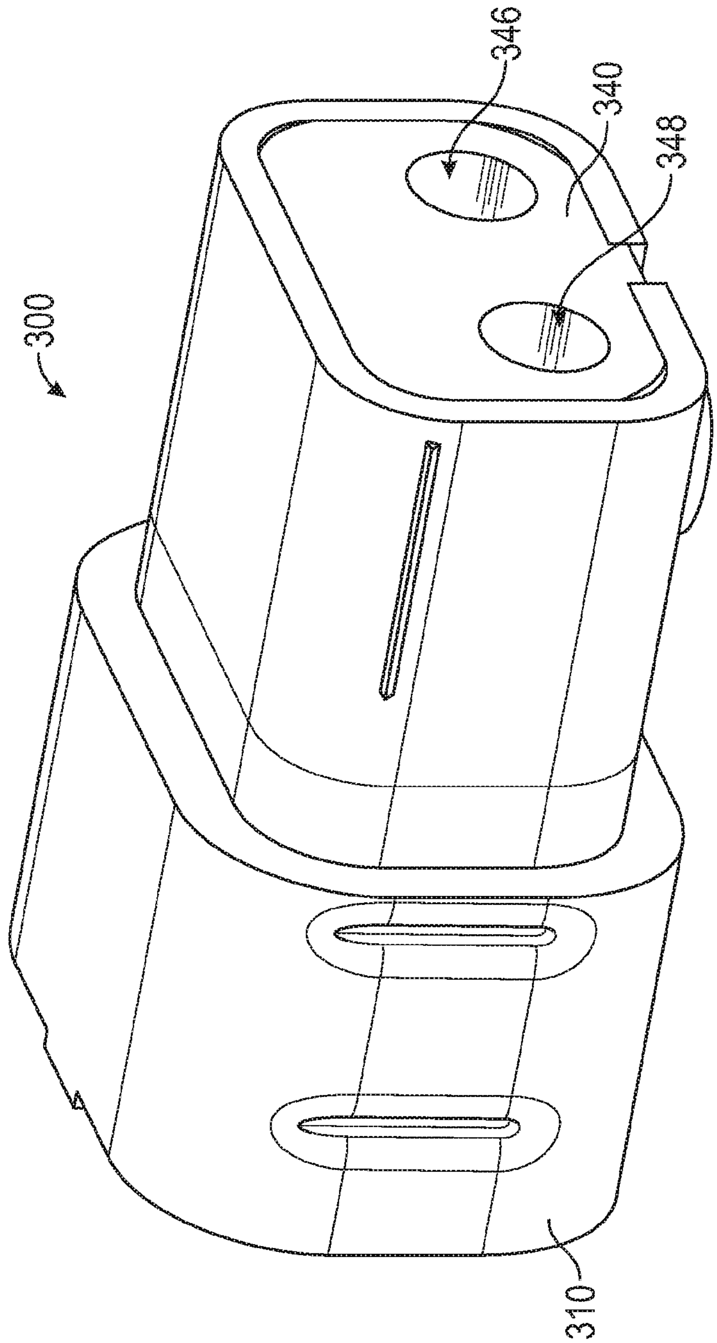
FIG. 10 illustrates a front perspective view of another cable adapter according to various embodiments of the present disclosure.
Figure 12:
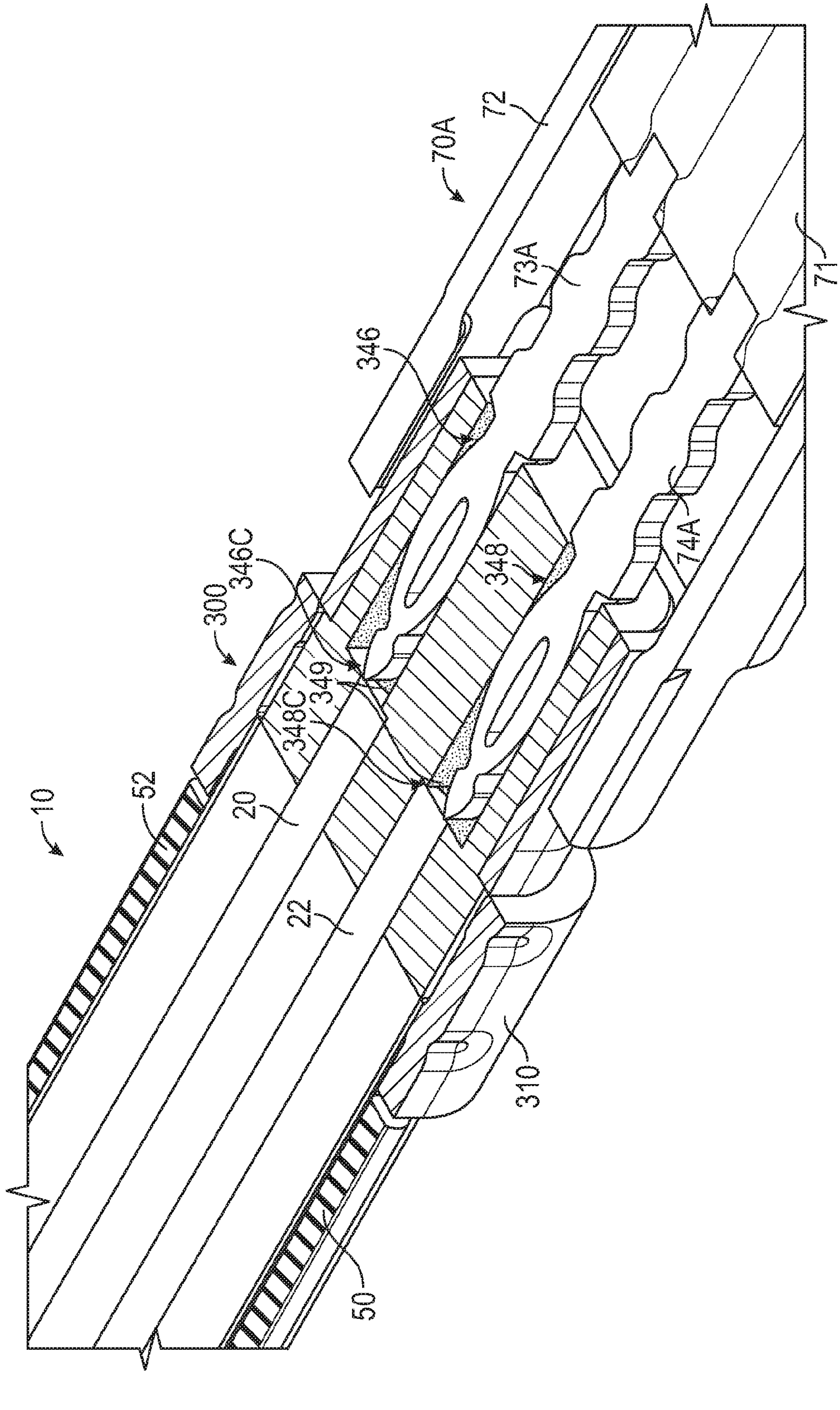
FIG. 12 illustrates a cross-sectional view of the cable adapter, cable, and parts of the connector shown in FIG. 10 according to various embodiments of the present disclosure.

FIG. 10 illustrates a front perspective view of another cable adapter 300 according to various embodiments of the present disclosure. The cable adapter 300 includes a housing 310 and an adapter insert 340 within the housing 310. The housing 310 is similar to the housings 110 and 210 described above. The adapter insert 340 is also similar to the adapter inserts 140 and 240 described above, but the apertures 346 and 348 have different positions and sizes as compared to those in the adapter inserts 140 and 240. The adapter insert 340 includes openings at the front and back surfaces for the apertures 346 and 348. The apertures 346 and 348 include a transition from a first diameter or size at the front surface of the adapter insert 340 to a second diameter or size at the back surface of the adapter insert 340. The sizes of the openings in the front surface are larger in diameter than the sizes of the openings at the back surface, as also shown in FIG. 12. The apertures 346 and 348 also include a conductive lining on at least a region or length of the inner surface of the apertures 3 and 348 within the adapter insert 340.

Figure 11:
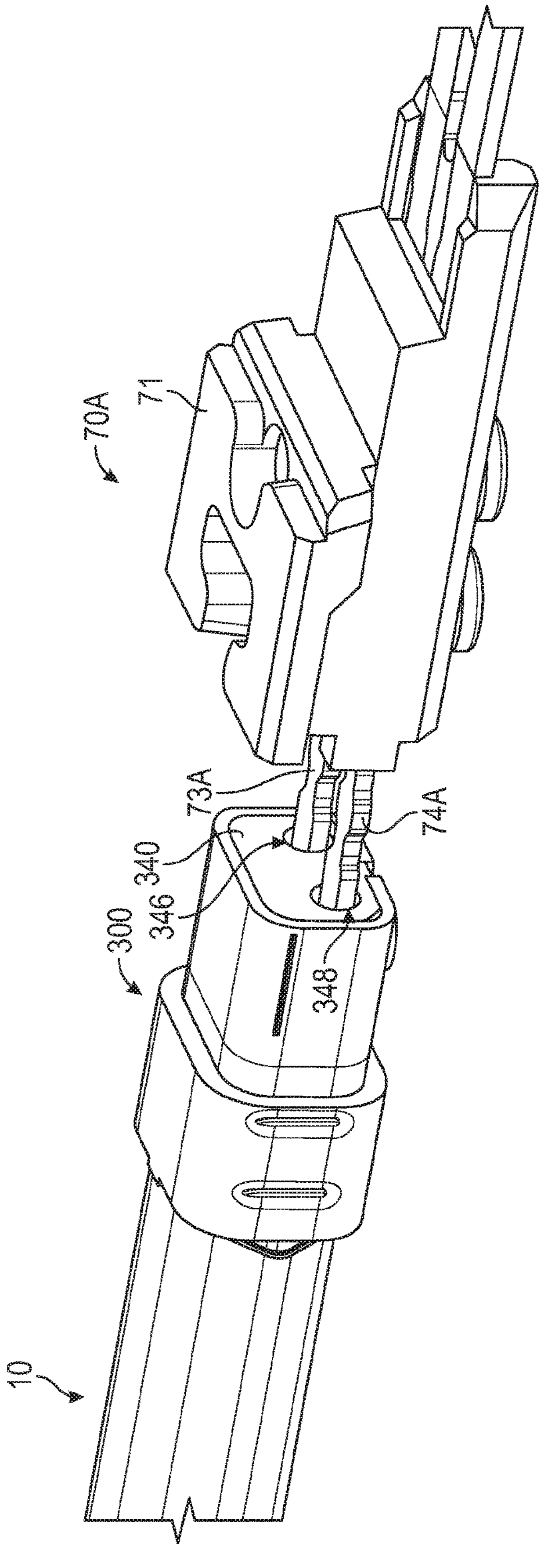
FIG. 11 illustrates a perspective view of the cable adapter shown in FIG. 10 with a cable and parts of a connector according to various embodiments of the present disclosure.

FIG. 11 illustrates a perspective view of the cable adapter 300 shown in FIG. 10 with a cable 10 and parts of a connector 70A according to various embodiments of the present disclosure. In FIG. 11, the connector base of the connector 70A (see FIG. 2B as an example) is omitted from view so that other features can be shown, including the conductors 73A and 74A of the connector 70A. The connector 70A is similar to the connector 250, although the conductors 73A and 74A of the connector 700A are longer than the conductors 73 and 74 of the connector 70. The connector 70A can be a standard form factor, with a spacing between the conductors 73A and 74A that matches the spacing between the apertures 346 and 348. The conductors 73A and 74A of the connector 70A are shown to be inserted within the apertures 346 and 348, and a cross-sectional view of this interconnection is shown in FIG. 12.

The cable adapter 300 provides an electrical coupling and transition between the conductors 20 and 22 of the cable 10 and the conductors 73A and 74A of the connector 70A, inside cable adapter 300, at a spacing to match the standard form factor of the connector 70A. Other cable adapters similar to the cable adapter 300 can be relied upon to provide a transition for cables other than the cable 10 to the standard spacing and form factor of the connector 70A.

FIG. 12 illustrates a cross-sectional view of the cable adapter 300, cable 10, and parts of the connector 70A shown in FIG. 10 according to various embodiments of the present disclosure. As shown, the conductors 20 and 22 of the cable 10 extend into the apertures 346 and 348 from the back of the adapter insert 340. The conductors 20 and 22 can be inserted into the adapter insert 340 such that the distal ends of the conductors 20 and 22 end at the transitions 346C and 348C of the apertures 346 and 348, respectively, as shown. In other cases, the conductors 20 and 22 can be inserted to other distances within the apertures 346 and 248. The conductors 20 and 22 make electrical contact with the lining of conductive material 349, which extends along the apertures 346 and 348. The conductors 73A and 74A of the connector 700A extend into the apertures 346 and 348 from the front of the adapter insert 340. The conductors 73A and 74A also make electrical contact with the lining of conductive material 349. The lining of conductive material 349 will thus electrically couple the conductors 20 and 22 of the cable 10 and the conductors 73A and 74A.

The cable adapter 300 provides an electrical coupling and transition between the conductors 20 and 22 of the cable 10 and the conductors 73A and 74A of the connector 70A, although the sizes and positions of the conductors 20 and 22 and the conductors 73A and 74A are different, as shown in FIG. 12. The electrical coupling provided by the cable adapter 300 provides an improved impedance or permittivity transition between the conductor 20 and 22 of the cable 10 and the conductors 73A and 74A, as compared to other techniques. The cable adapter 300 helps to reduce the unwanted or undesirable effects related to impedance or permittivity mismatches, among other undesirable electrical properties. As examples, the improved transition provided by the cable adapter 300 helps to reduce signal reflections, increased interference and crosstalk, increased distortion, decreased signal to noise ratios, decreased bandwidth, and other issues.

Figure 13:
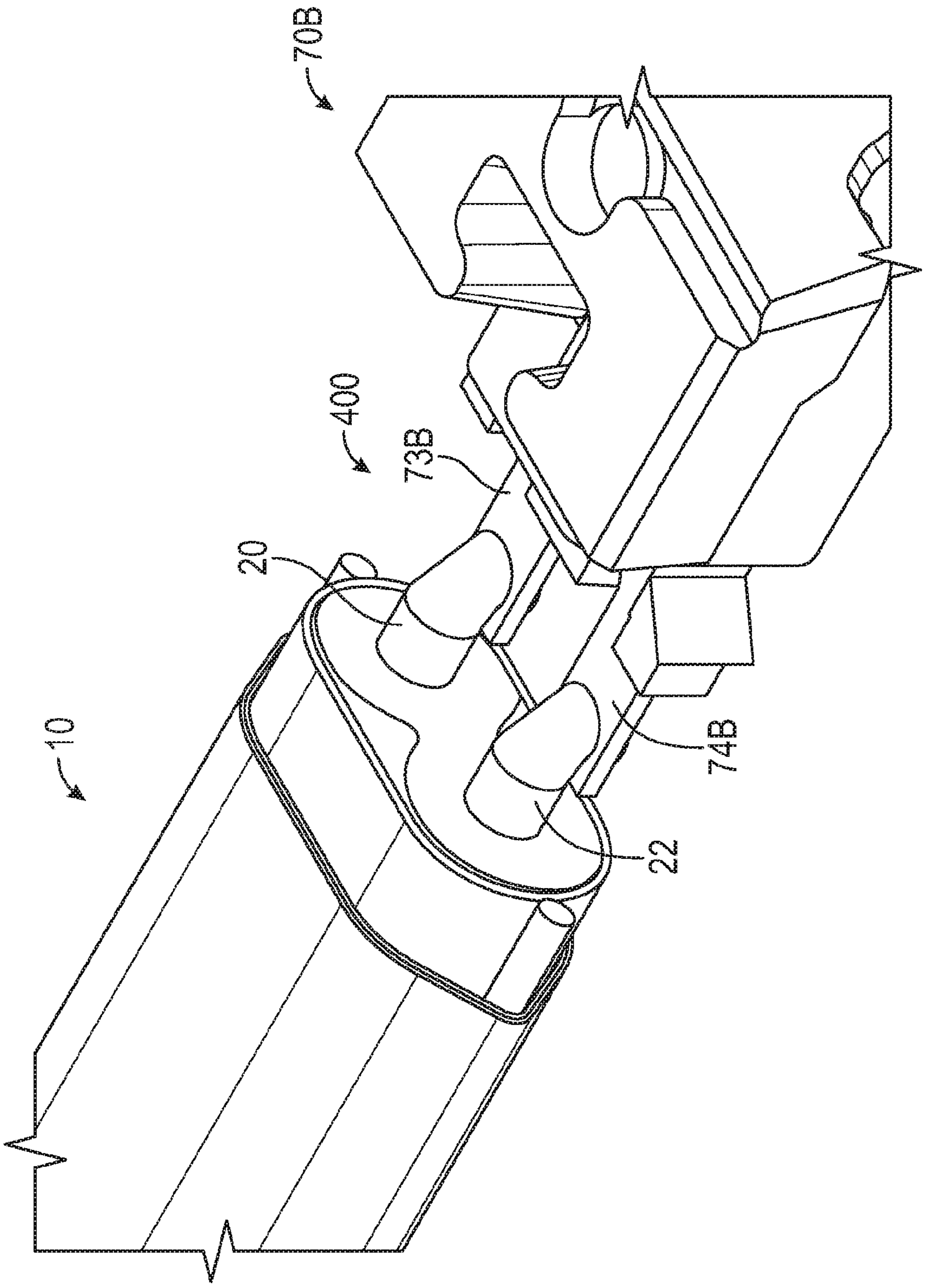
FIG. 13 illustrates an example electrical coupling between conductors of a cable and pins of a connector, to be positioned within a cable adapter according to various embodiments of the present disclosure.

FIG. 13 illustrates an example electrical coupling 400 between conductors 20 and 22 of the cable 10 and pins or conductors 73B and 74B of a connector 70B, to be positioned within a cable adapter according to various embodiments of the present disclosure. Certain components of the connector 70B, such as the connector base, are omitted from view in FIG. 13, so that other components can be seen. As shown in FIG. 13, the electrical coupling 400 includes a swaged connection between the conductors 20 and 22 and the conductors 73B and 74B of the connector 70B. The conductors 20 and 22 are turned and inserted through openings or apertures of the conductors 73B and 74B, toward the distal ends of the conductors 73B and 74B. The conductors 20 and 22 can also be soldered, welded, or otherwise secured and electrically coupled to the conductors 73B and 74B in the arrangement shown. The electrical coupling 400 can be positioned with in a cable adapter according to the concepts described herein and particularly within the adapter insert of the cable adapter.

Figure 14:
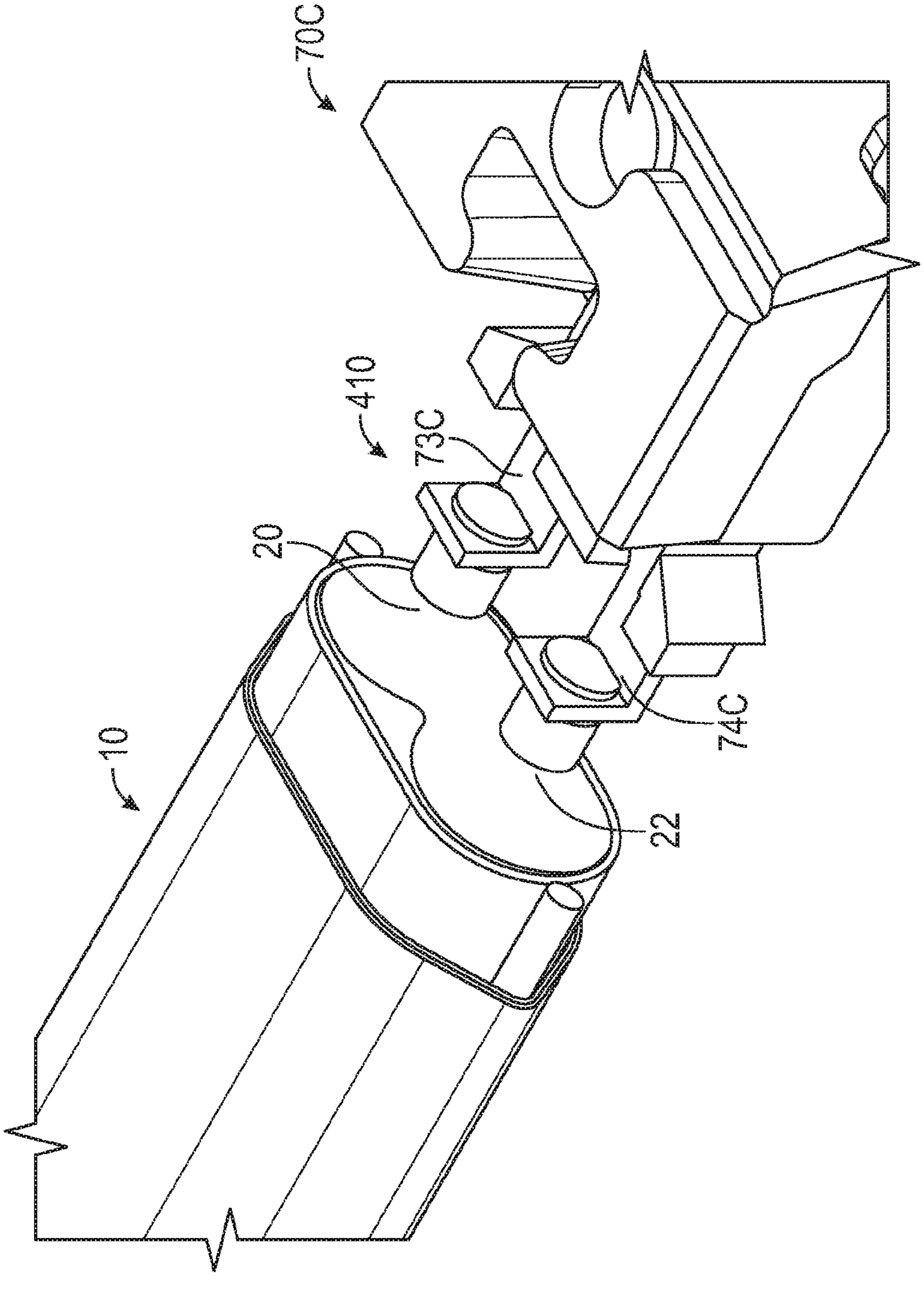
FIG. 14 illustrates another example electrical coupling between conductors of a cable and pins of a connector, to be positioned within a cable adapter according to various embodiments of the present disclosure.

FIG. 14 illustrates another example electrical coupling 410 between conductors 20 and 22 of the cable 10 and conductors 73C and 74C of a connector 70C, to be positioned within a cable adapter according to various embodiments of the present disclosure. Certain components of the connector 70C, such as the connector base, are omitted from view in FIG. 14, so that other components can be seen. As shown in FIG. 14, the electrical coupling 410 includes a weld tail connection between the conductors 20 and 22 and the conductors 73C and 74C of the connector 70C. The conductors 20 and 22 are inserted through openings or apertures of the conductors 73C and 74C, toward the distal ends of the conductors 73C and 74C. The conductors 20 and 22 can also be soldered, welded, or otherwise secured and electrically coupled to conductors 73C and 74C in the arrangement shown. The electrical coupling 410 can be positioned with in a cable adapter according to the concepts described herein and particularly within the adapter insert of the cable adapter.

Figure 15:
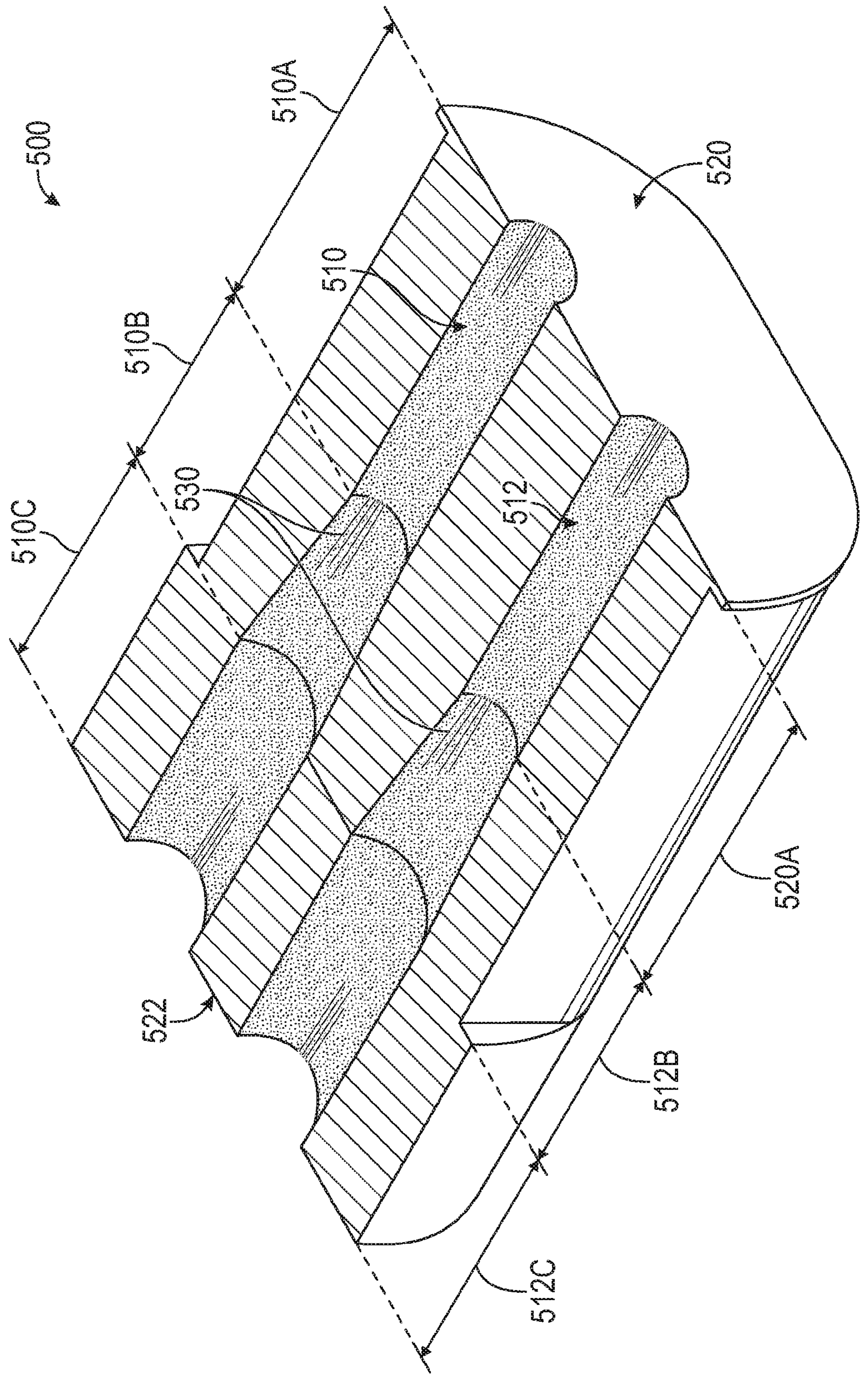
FIG. 15 illustrates a cross-sectional view of another cable adapter according to various embodiments of the present disclosure.

FIG. 15 illustrates a cross-sectional view of another adapter insert 500 according to various embodiments of the present disclosure. Particularly, a bottom half of the adapter insert 500 is shown in FIG. 15, and the top half of the adapter insert 500 can be embodied as a mirror image of the bottom half shown in FIG. 15. The adapter insert 500 can be inserted within a housing, such as the housing 110 described herein. The adapter insert 500 can be formed from a dielectric insulating material, such as a fluoropolymer, PE, PTFE, or other plastic, or other insulating material. An example Dk of the dielectric insulator can range from 1.5-3, although the adapter insert 500 is not limited to any particular type or characteristic of insulating material.

The adapter insert 500 includes apertures 510 and 512, which extend from a front surface 520 to a back surface 522 of the adapter insert 500. Thus, the adapter insert 500 includes openings at the front surface 520 for the apertures 510 and 512 and openings at the back surface 522 for the apertures 510 and 512. The apertures 510 and 512 are circular, as shown in FIGS. 15, for the insertion of conductors into the apertures 510 and 512. In other examples, the adapter insert 500 can include additional apertures, such as three, four, or more apertures, each similar to the apertures 510 and 512.

The apertures 510 and 512 include a transition from a first diameter or size at the front surface 520 to a second diameter or size at the back surface 522, consistent with other examples described herein. In the example shown, the sizes of the openings in the front surface 520 are smaller in diameter than the sizes of the openings at the back surface 522. The apertures 510 and 512 also include a lining of conductive material 530 on at least a region or length of the inner surface of the apertures 510 and 512 within the adapter insert 500.

The aperture 510 includes a first aperture length 510A, a transitional or tapered aperture length 510B, and a second aperture length 510C. The aperture 512 includes a first aperture length 512A, a transitional or tapered aperture length 512B, and a second aperture length 512C. The first aperture length 510A is sized to a first diameter, and the second aperture length 510C is sized to a second diameter. The tapered aperture length 510B is formed to or includes a tapering diameter, tapering from the first diameter of the first aperture length 510A to the second diameter of the second aperture length 510C. The first aperture length 512A is also formed or sized to the first diameter, and the second aperture length 512C is also formed or sized to the second diameter. The tapered aperture length 512B includes a tapering diameter, tapering from the first diameter of the first aperture length 512A to the second diameter of the second aperture length 512C.

The inner surfaces of the apertures 510 and 512 include a lining of conductive material 530, which extends along at least a length of the apertures 510 and 512. Thus, the apertures 510 and 512 are conductive apertures. The lining of conductive material 530 can include a lining of one or more metal layers, metal alloy layers, sintered metal particle layers, or other layers of conductive material, similar to the linings of conductive materials 149 and 249, as described above. In some cases, an outer surface along the length of the adapter insert 500 can also include a lining of conductive material. The tapered aperture length 510B provides an electromagnetic transition with a low impedance or permittivity mismatch between the first aperture length 510A and the second aperture length 510C. The tapered aperture length 512B also provides an electromagnetic transition with a low impedance or permittivity mismatch between the first aperture length 512A and the second aperture length 512C.

The adapter insert 500, when used in a cable adapter as described herein, provides an electrical coupling and transition between the conductors of the cables, such as the cables 10 and 10A, although the conductors of the cables 10 and 10A have different diameters and pitches. The electrical coupling provided by the adapter insert 500 provides an improved impedance or permittivity transition between the conductors of the cables 10 and 10A, as compared to other techniques for coupling the conductors, such as other styles of connectors and interconnection techniques. The adapter insert 500 helps to reduce the unwanted or undesirable effects that can be imparted upon data signals communicated over the cables 10 and 10A when the conductors in the cables 10 and 10A are electrically coupled together. As examples, the improved transition provided by the adapter insert 500 can reduce signal reflections, reduce interference and crosstalk, reduce distortion, increase signal to noise ratios, and increase bandwidth in transitions between conductors of different diameters, such as conductors of different diameters in twinax cables.

Figure 16:
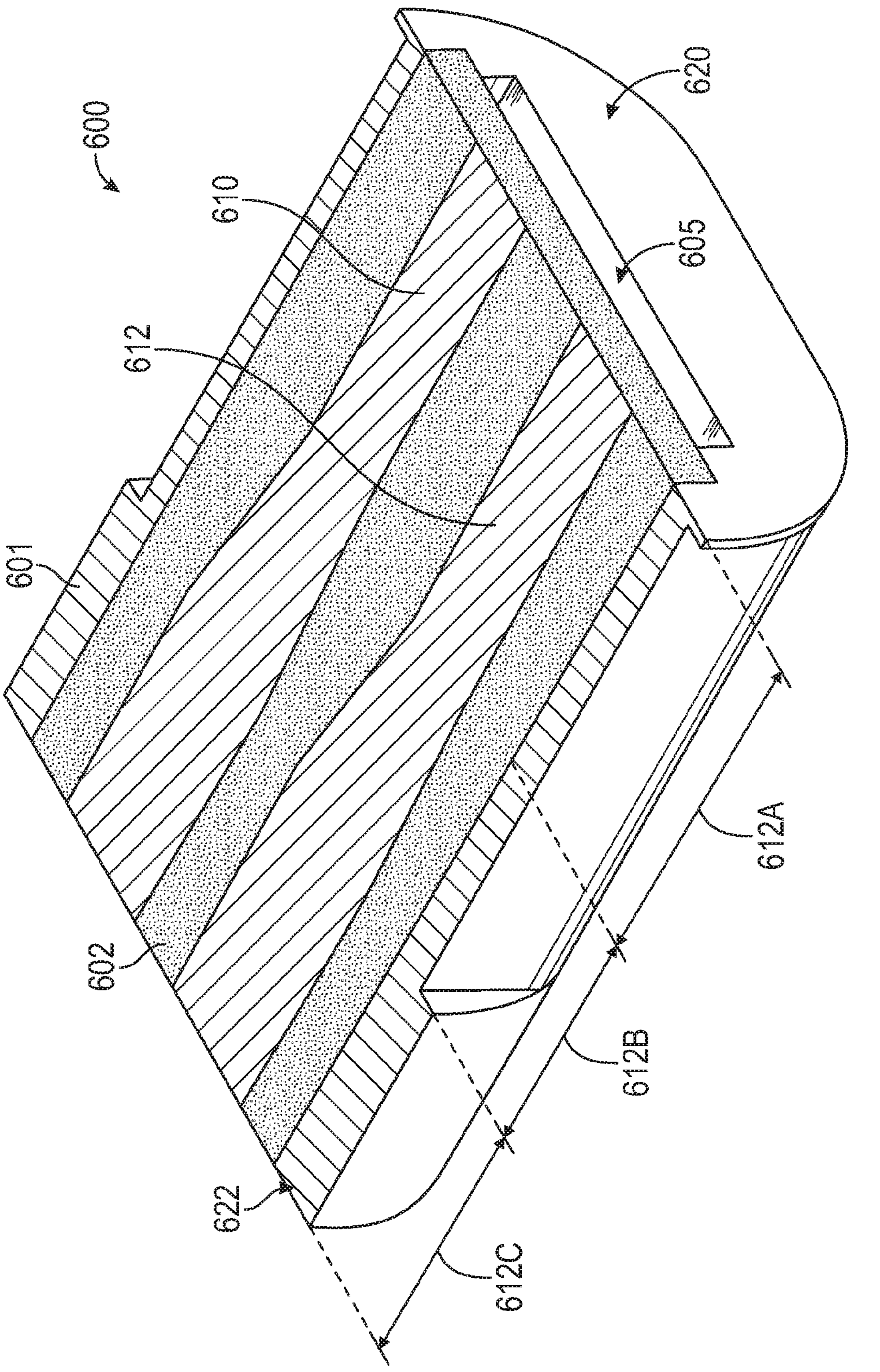
FIG. 16 illustrates a cross-sectional view of another cable adapter according to various embodiments of the present disclosure.

FIG. 16 illustrates another adapter insert 600 according to various embodiments of the present disclosure. The adapter insert 600 includes a lower body 601, a printed circuit board (PCB) 602, including traces 610 and 612 on the top surface of the PCB 602, and an air gap 605 positioned under the PCB 602, as shown in FIG. 16. The adapter insert 600 can be inserted within a housing, such as the housing 110 described herein. The lower body 601 of the adapter insert 600 can be formed from a dielectric insulating material, such as a fluoropolymer, PE, PTFE, or other plastic, or other insulating material. An example Dk of the dielectric insulator can range from 1.5-3, although the adapter insert 500 is not limited to any particular type or characteristic of insulating material. In some cases, a portion of an outer surface along the length of the lower body 601 of the adapter insert 600 can also include a lining of conductive material. In some cases, the adapter insert 600 can also include a second, upper body, which is not shown in FIG. 16. The upper body can be similar to the lower body 601 and include an air gap similar to the air gap 605. However, the air gap in the upper body can be larger to permit clearance between conductors secured to the traces 610 and 612 on the top surface of the PCB 602 and the upper body.

The adapter insert 600 also includes a printed circuit board (PCB) 602, including traces 610 and 612 on the top surface of the PCB 602, and an air gap 605 positioned under the PCB 602, as shown in FIG. 16. The PCB 602 can be embodied as a glass-reinforced epoxy laminate (e.g., FR4 laminate), but a range of other materials having a range of Dk values can be relied upon. Other example materials include the ROGERS® 1200 series, 3450, 6010, 4003C, 4350B, or 4450B core materials, as examples, although alumina, silicon, and other materials can be used. The PCB 602 can be laminated or otherwise adhered to a seat formed in the adapter insert 600, with the air gap 605 positioned under the PCB 602. In some cases, the PCB 602 can also include a ground plane formed on a bottom surface of the PCB 602, opposite the traces 610 and 612, and the traces 610 and 612 can be embodied as microstrip traces. The ground plane can be electrically coupled to the housing in which the adapter insert 600 is inserted.

The PCB 602 is shown to have a certain width, length, and thickness in FIG. 16, but the dimensions of the PCB 602 are representative in FIG. 16 and can vary as compared to that shown. Similarly, the air gap 605 is also shown to have a certain width, length, and thickness, but the dimensions of the air gap 605 are representative and can vary as compared to that shown. In some cases, the width of the air gap 605 can be less than the width of the PCB 602.

The traces 610 and 612 of the PCB 602 extend along the length of the PCB 602, as measured from a front surface 620 to a back surface 622 of the adapter insert 600. The traces 610 and 612 both include a transition from a first width or size at the front surface 620 to a second width or size at the back surface 622. Thus, the traces 610 and 612 include conductive transitions of the adapter insert 600. In the example shown, the first widths are smaller in than the second widths. The trace 612 includes a first trace length 612A, a transitional or tapered trace length 612B, and a second trace length 612C, and the trace 610 includes similar trace lengths and a tapered trace length. The tapered trace length 612B is formed to include a tapering width, tapering from the first width of the first trace length 612A to the second width of the second trace length 612C. The tapered trace length 612B includes an electromagnetic line taper between the first trace length 612A and the tapered trace length 612B, and tapered trace length 612B includes an electromagnetic line taper between the second trace length 612C and the tapered trace length 612B. The tapered trace length 612B provides an electromagnetic transition with a low impedance or permittivity mismatch between the first trace length 612A and the second trace length 612C.

The adapter insert 600, when used in a cable adapter as described herein, provides an electrical coupling and transition between the conductors of the cables, such as the cables 10 and 10A, although the conductors of the cables 10 and 10A have different diameters and pitches. The conductors of the cables 10 and 10A can be electrically coupled to the traces 610 and 612 using a solder or other electrical coupling means. For example, the conductors 20 and 22 of the cable 10 can be electrically coupled or terminated, respectively, to the second trace length 612C of the trace 610 and to the second trace length 612C of the trace 612. Additionally, the conductors of the cable 10A can be electrically coupled or terminated, respectively, to the first trace length 612A of the trace 610 and to the first trace length 612A of the trace 612.

The conductors of the cables 10 and 10A can be terminated to only a portion of the traces 610 and 612. For example, it is not necessary for the conductors 20 and 22 to be electrically coupled across the entire second trace length 612C of the trace 610 and across the entire second trace length 612C of the trace 612 in all cases. In some cases, the conductors 20 and 22 can be electrically coupled to only a portion of the second trace length 612C of the trace 610 and to only a portion of the second trace length 612C of the trace 612. Similarly, the conductors of cable 10A can be electrically coupled, respectively, to the first trace length 612A of the trace 610 and to the first trace length 612C of the trace 612. However, it is not necessary for the conductors of the cable 10A to be electrically coupled to the entire first trace length 612C of the trace 610 and to the entire first trace length 612C of the trace 612 in all cases. The conductors of the cables 10 and 10A can be coupled to only portions of the first and second trace lengths 612A and 612C of the traces 610 and 612 to control the impedance of the termination between the conductors of the cables 10 and 10A and the traces 610 and 612.

The air gap 605 extends from the front surface 620 to the back surface 622 of the adapter insert 600 in length. As noted above, the air gap 605 has a width, a length, and a thickness (e.g., depth into the lower body 601) under the PCB 602. The dimensions of the air gap 605 can vary, as the air gap 605 extends from the front surface 620 to the back surface 622 of the adapter insert 600. In some cases, the width of the air gap 605 can vary along the length of the air gap 605. For example, the air gap 605 can be narrower in width over a distance corresponding to the first trace length 612A (or a portion of the first trace length 612A) and wider over a distance corresponding to the second trace length 612C (or a portion of the second trace length 612C).

Additionally, the depth of the air gap 605 can vary along the length of the air gap 605. For example, the air gap 605 can be larger in thickness or depth over a distance corresponding to the first trace length 612A and the second trace length 612C and smaller or shallower in thickness over a distance corresponding to the tapered trace length 612B. In another example, the air gap 605 can be larger in thickness or depth under the portions of the traces 610 and 612 where the conductors of the cables 10 and 10A are terminated to the traces 610 and 612 and smaller or shallower in thickness under the portions of the traces 610 and 612 where the conductors of the cables 10 and 10A are not terminated to the traces 610 and 612. The air gap 605 can be deeper under the regions where the conductors of the cables 10 and 10A are terminated to the traces 610 and 612 to compensate for changes in impedance at the termination regions between the conductors of the cables 10 and 10A and the traces 610 and 612.

The electrical coupling provided by the adapter insert 600 provides an improved impedance or permittivity transition between the conductors of the cables 10 and 10A, as compared to other techniques for coupling the conductors, such as other styles of connectors and interconnection techniques. The adapter insert 600 can reduce the unwanted or undesirable effects that can be imparted upon data signals communicated over the cables 10 and 10A when the conductors in the cables 10 and 10A are electrically coupled together. As examples, the improved transition provided by the adapter insert 600 can reduce signal reflections, reduce interference and crosstalk, reduce distortion, increase signal to noise ratios, and increase bandwidth in transitions between conductors of different diameters, such as conductors of different diameters in twinax cables.

Terms such as "top," "bottom," "side," "front," "back," "right," and "left" are not intended to provide an absolute frame of reference. Rather, the terms are relative and are intended to identify certain features in relation to each other, as the orientation of structures described herein can vary. The terms "comprising," "including," "having," and the like are synonymous, are used in an open-ended fashion, and do not exclude additional elements, features, acts, operations, and so forth. Also, the term "or" is used in its inclusive sense, and not in its exclusive sense, so that when used, for example, to connect a list of elements, the term "or" means one, some, or all of the elements in the list. Disjunctive language, such as the phrase "at least one of X, Y, Z," unless indicated otherwise, is used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The above-described embodiments of the present disclosure are merely examples of implementations to provide a clear understanding of the principles of the present disclosure. Many variations and modifications can be made to the above-described embodiments without departing substantially from the spirit and principles of the disclosure. In addition, components and features described with respect to one embodiment can be included in another embodiment. All such modifications and variations are intended to be included herein within the scope of this disclosure.

What is claimed is:

1. A transitional cable adapter, comprising:

an adapter insert, the adapter insert comprising a conductive aperture, the conductive aperture extending from a front surface to a back surface of the adapter insert and comprising a first aperture length sized to a first diameter for a first conductor, a second aperture length sized to a second diameter different than the first diameter for a second conductor, and a transition between the first aperture length and the second aperture length; and a housing around the adapter insert, wherein:

the adapter insert includes a lining of conductive material on a region of an outer surface of the adapter insert; and the conductive aperture of the adapter insert comprises a lining of conductive material on an inner surface of the conductive aperture within the adapter insert.

2. The transitional cable adapter according to claim 1, wherein the adapter insert comprises a dielectric insulating material.

3. The transitional cable adapter according to claim 1, wherein the lining of conductive material on the inner surface of the aperture within the adapter insert comprises a lining of at least one layer of metal or metal alloy.

4. The transitional cable adapter according to claim 1, wherein:

the first aperture length of the conductive aperture comprises a first diameter for a first gauge of the first conductor; and the second aperture length of the conductive aperture comprises a second diameter for a second gauge of the second conductor.

5. The transitional cable adapter according to claim 1, wherein the conductive aperture comprises a plurality of conductive apertures, each conductive aperture among the plurality of conductive apertures extending from the front surface to the back surface of the adapter insert and comprising a first diameter for a first gauge of the first conductor and a second diameter for a second gauge of the second conductor.

6. The transitional cable adapter according to claim 1, wherein the transition between the first aperture length of the conductive aperture and the second aperture length of the conductive aperture is positioned between the front surface of the adapter insert and the back surface of the adapter insert.

7. The transitional cable adapter according to claim 1, wherein the transition between the first aperture length of the conductive aperture and the second aperture length of the conductive aperture comprises a tapered aperture length having a tapering diameter, the tapering diameter tapering from the first diameter of the first aperture length to the second diameter of the second aperture length.

8. The transitional cable adapter according to claim 1, wherein:

the housing is formed from a metal or metal alloy;

the housing comprises a first opening at one end of the housing and a second opening at another end of the housing; and the first opening is larger than the second opening.

9. The transitional cable adapter according to claim 8, wherein an inner surface of the housing contacts and is electrically coupled to the lining of conductive material on the region of the outer surface of the adapter insert.

10. The transitional cable adapter according to claim 1, wherein:

the housing comprises a gap; and the adapter insert comprises an interlock feature sized to fit within the gap of the housing, to secure and position the adapter insert with the housing.

11. The transitional cable adapter according to claim 1, wherein the housing includes a first detent on a first side of the housing and a second detent on a second side of the housing.

12. A transitional cable adapter, comprising:

an adapter insert, the adapter insert comprising a seat formed into the adapter insert;

a printed circuit board (PCB) positioned in the seat of the adapter insert, the PCB comprising a conductive transition on a first side of the PCB, the conductive transition extending from a front to a back of the adapter insert, the conductive transition comprising a first conductive length at a first width for a first conductor, a second conductive length at a second width different than the first width for a second conductor, and a transition between the first conductive length and the second conductive length; and a housing around the adapter insert.

13. The transitional cable adapter according to claim 12, wherein the conductive transition comprises a plurality of conductive transitions, each conductive transition among the plurality of conductive transitions extending from the front to the back of the adapter insert and comprising a first conductive length, a second conductive length, and a transition between the first conductive length and the second conductive length.

14. The transitional cable adapter according to claim 12, wherein the transition between the first conductive length and the second conductive length comprises a tapering width, tapering from the first width of the first conductive length to the second width of the second conductive length.

15. The transitional cable adapter according to claim 12, wherein:

the PCB further comprises a ground plane on a second side of the PCB; and the first conductive length, the second conductive length, and the transition are formed as microstrip traces on the first side of the PCB.

16. The transitional cable adapter according to claim 15, wherein the adapter insert further comprises an air gap between the PCB and the adapter insert.

* * * * *